(12) United States Patent
Astarabadi et al.

(10) Patent No.: US 12,175,571 B2
(45) Date of Patent: \*Dec. 24, 2024

(54) METHOD FOR SECURING SYNTHETIC VIDEO CONFERENCE FEEDS

(71) Applicant: Present Communications, Inc., Redwood City, CA (US)

(72) Inventors: Yousif Astarabadi, Redwood City, CA (US); Matt Mireles, Redwood City, CA (US); Shaun Astarabadi, Redwood City, CA (US); Kristina Nikkhah, Redwood City, CA (US)

(73) Assignee: Present Communications, Inc., Redwood City, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/736,823

(22) Filed: May 4, 2022

(65) Prior Publication Data

US 2022/0264056 A1    Aug. 18, 2022

Related U.S. Application Data

(63) Continuation of application No. 17/353,575, filed on Jun. 21, 2021, now Pat. No. 11,356,640, which is a
(Continued)

(51) Int. Cl.
| | |
|---|---|
| *G06T 11/60* | (2006.01) |
| *G06T 7/33* | (2017.01) |
| *G06T 19/20* | (2011.01) |
| *G06V 10/764* | (2022.01) |
| *G06V 20/40* | (2022.01) |

(Continued)

(52) U.S. Cl.
CPC .............. *G06T 11/60* (2013.01); *G06T 7/344* (2017.01); *G06T 19/20* (2013.01); *G06V 10/764* (2022.01);
(Continued)

(58) Field of Classification Search
None
See application file for complete search history.

(56) References Cited

U.S. PATENT DOCUMENTS 8,943,568 B1 *   1/2015   Hromi ................... H04L 63/107
                                                                                              726/26
9,813,666 B2 *   11/2017   Law ......................... H04N 7/14
(Continued)

*Primary Examiner* — Stella L. Woo
(74) *Attorney, Agent, or Firm* — Run8 Patent Group, LLC; Peter Miller

(57) ABSTRACT

One variation of a method for securing synthetic video conference feeds includes, during a setup period: accessing a target image depicting a face of a user; generating a face model based on a target set of facial features detected in the target image; and linking the face model to a target set of facial biometric values of the user. The method also includes, during an operating period succeeding the setup period: accessing a frame; deriving characteristics of a set of facial features detected in the frame; extracting a set of facial biometric values from the frame; in response to alignment between the target set of facial biometric values and the set of facial biometric values, generating a synthetic face image based on characteristics of the set of facial features, the face model, and a synthetic face generator; and rendering the synthetic face image in place of the frame.

4 Claims, 10 Drawing Sheets

Related U.S. Application Data continuation-in-part of application No. 17/192,828, filed on Mar. 4, 2021, now Pat. No. 11,218,668, which is a continuation-in-part of application No. 16/870,010, filed on May 8, 2020, now Pat. No. 10,958,874.

(60) Provisional application No. 63/041,779, filed on Jun. 19, 2020, provisional application No. 62/845,781, filed on May 9, 2019.

(51) Int. Cl.
*G06V 40/16* (2022.01)
*H04L 9/08* (2006.01)
*H04L 9/32* (2006.01)
*H04N 7/15* (2006.01)

(52) U.S. Cl.
CPC .............. *G06V 20/46* (2022.01); *G06V 20/47* (2022.01); *G06V 40/168* (2022.01); *G06V 40/171* (2022.01); *G06V 40/172* (2022.01); *G06V 40/174* (2022.01); *H04L 9/0819* (2013.01); *H04L 9/3231* (2013.01); *H04N 7/157* (2013.01); *G06T 2207/30201* (2013.01); *G06T 2219/2021* (2013.01)

(56) References Cited

U.S. PATENT DOCUMENTS

| | | | |
|---|---|---|---|
| 10,825,564 B1* | 11/2020 | Zhang | G06V 40/10 |
| 11,356,640 B2* | 6/2022 | Astarabadi | H04N 7/147 |
| 2006/0206713 A1* | 9/2006 | Hickman | H04L 51/212 |
| | | | 713/176 |
| 2013/0305336 A1* | 11/2013 | Konertz | H04L 63/0861 |
| | | | 726/7 |
| 2018/0089880 A1* | 3/2018 | Garrido | H04N 21/4788 |
| 2019/0206101 A1* | 7/2019 | De la Torre | G06T 11/60 |
| 2019/0325770 A1* | 10/2019 | Foster | G06V 40/20 |
| 2020/0020173 A1* | 1/2020 | Sharif | G06T 19/20 |

* cited by examiner

METHOD FOR SECURING SYNTHETIC VIDEO CONFERENCE FEEDS

CROSS-REFERENCE TO RELATED APPLICATIONS

This application is a continuation of U.S. Non-Provisional patent application Ser. No. 17/353,575, filed on 21 Jun. 2021, which is a continuation-in-part of U.S. patent application Ser. No. 17/192,828, filed on 4 Mar. 2021, which is a continuation-in-part of U.S. patent application Ser. No. 16/870,010, filed on 8 May 2020, which claims the benefit of U.S. Provisional Application No. 62/845,781, filed on 9 May 2019, each of which is incorporated in its entirety by this reference.

This application also claims the benefit of U.S. Provisional Application No. 63/041,779, filed on 19 Jun. 2020, which is incorporated in its entirety by this reference.

TECHNICAL FIELD

This invention relates generally to the field of video conferencing and more specifically to a new and useful method for securing synthetic video conference feeds in the field of video conferencing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
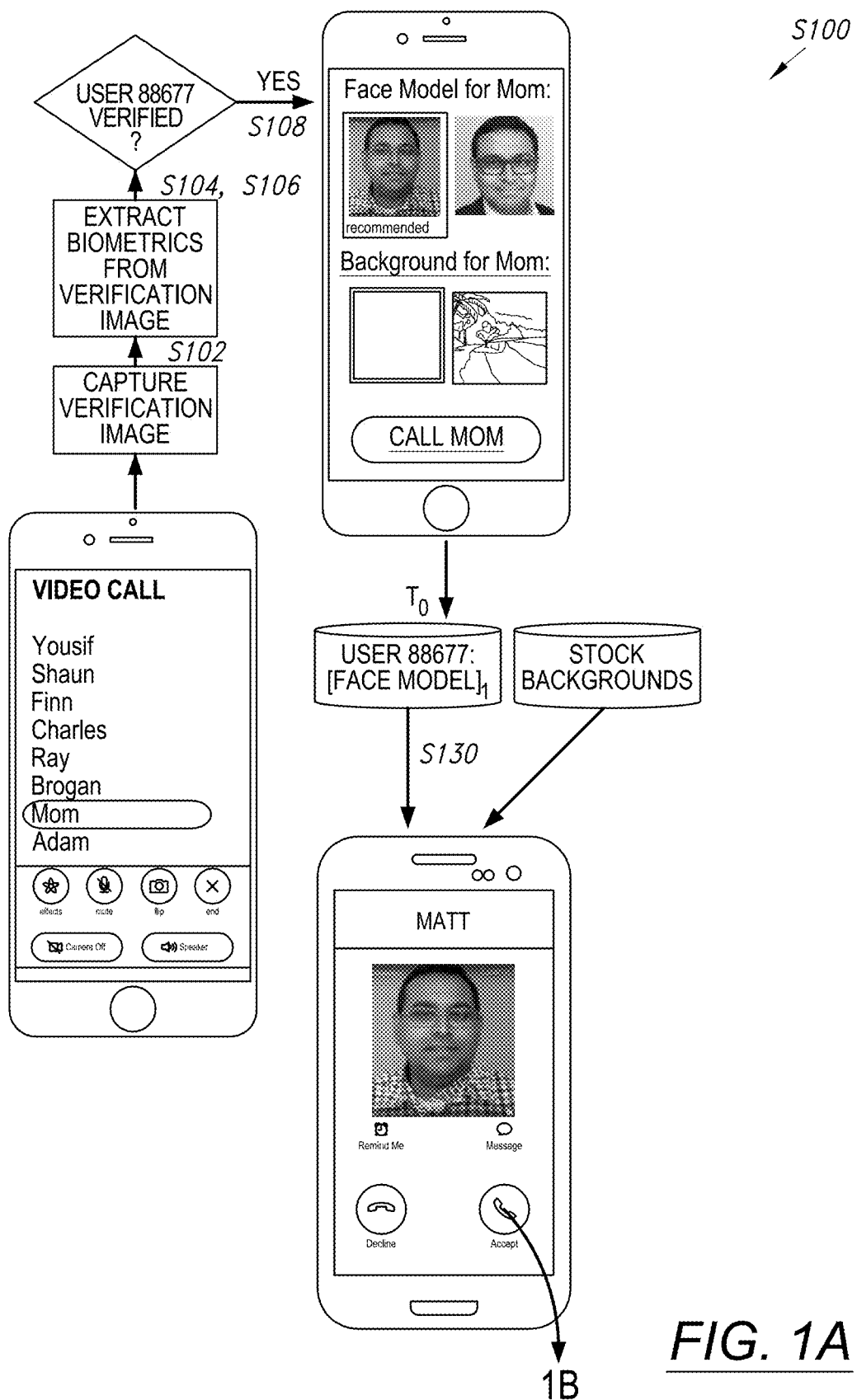
FIGS. 1A-1C are flowchart representations of a method.
Figure 1B:
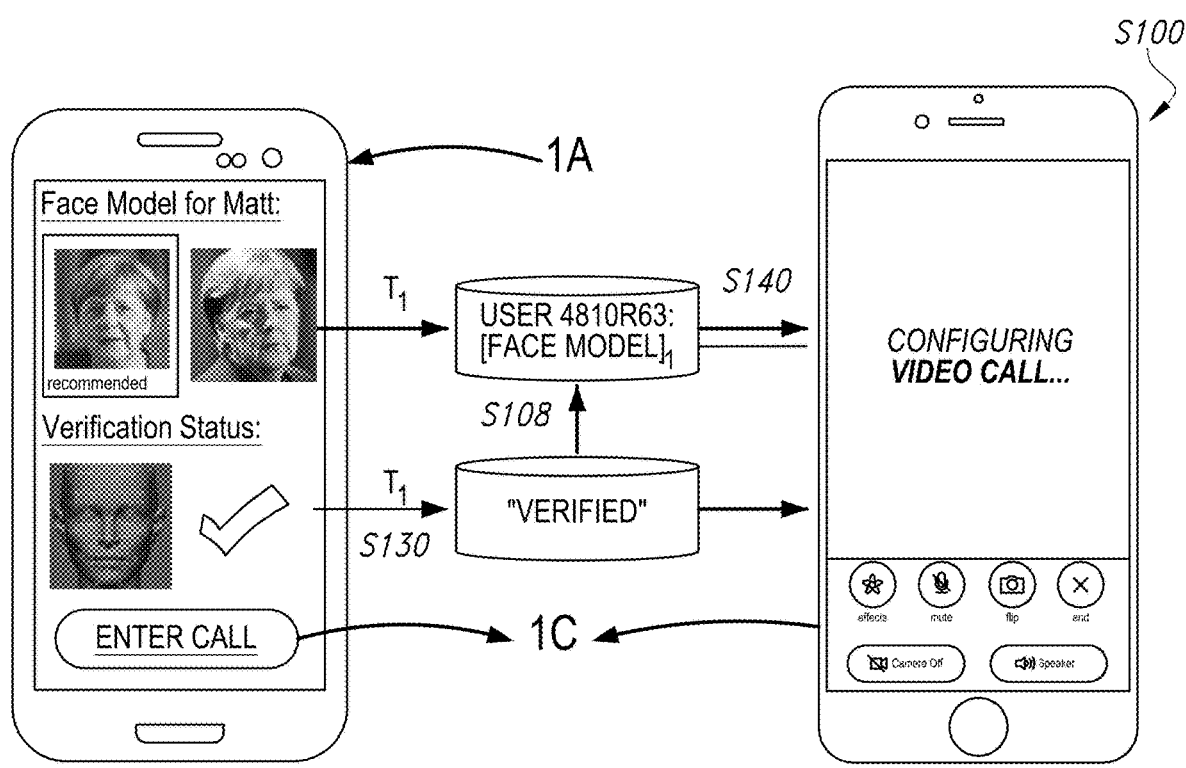
Figure 1C:
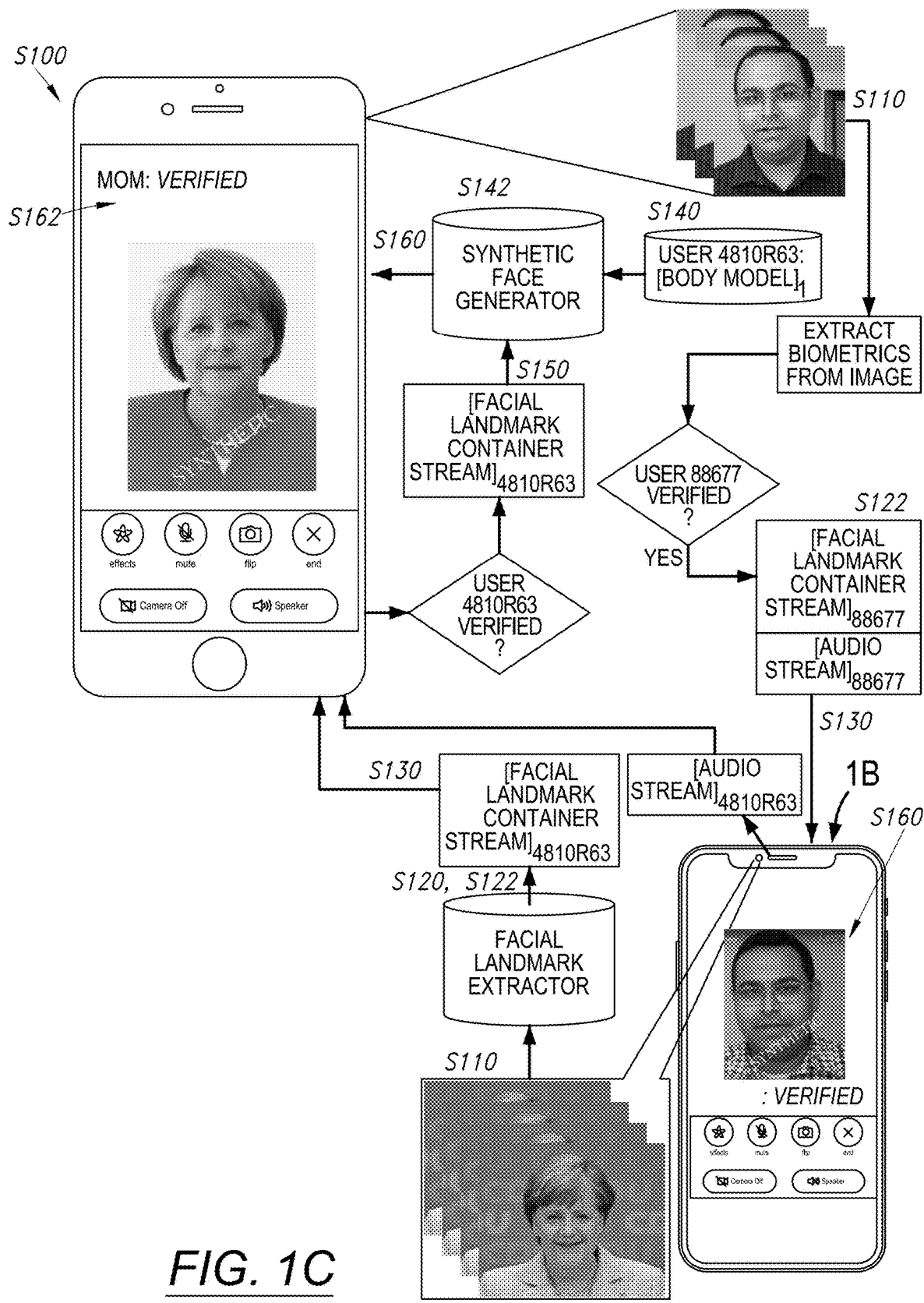

As shown in FIGS. 1A-1C, a method S100 for securing synthetic video conference feeds includes, at a first device associated with a first user and prior to a video call between a first user at a first device and a second user at a second device: accessing a target image captured at the first device in Block S102; detecting a first face in a first region of the target image in Block S104; extracting a constellation of facial biometric values from the first region of the target image in Block S106; and, in response to the constellation of facial biometric values aligning with a first faceprint of a first user account, enabling the first user at the first device to select a first look model, from a first set of look models, associated with the first user account in Block S108. The method S100 also includes, during the video call: accessing a first video feed captured at the first device in Block S110; for a first frame, in the first video feed, captured at a first time, detecting a first constellation of facial landmarks in the first frame in Block S120; representing the first constellation of facial landmarks in a first facial landmark container in Block S122; extracting a first constellation of facial biometric values from the first frame in Block S124; and, in response to the constellation of facial biometric values aligning with the first faceprint of the first user account, transmitting the first facial landmark container and confirmation of the first user to the second device in Block S130.

The method S100 can further include, at the second device: accessing the first look model in Block S140; and accessing a synthetic face generator in Block S142. The method S100 also includes, at the second device, in response to receiving the first facial landmark container and confirmation of the first user from the first device: inserting the first facial landmark container and the first look model into the synthetic face generator to generate a first synthetic face image in Block S150; rendering the first synthetic face image at a second time in Block S160; and rendering verification of the first user in Block S162.

1.1 Biometric Control for Synthetic Face Image Generation

Figure 5A:
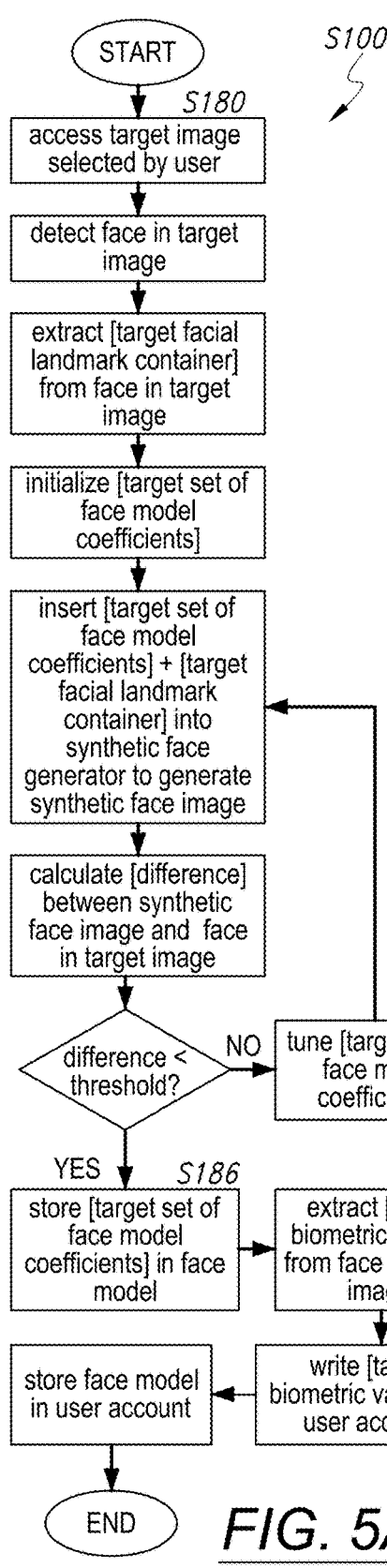
FIGS. 5A, 5B, and 5C are flowchart representations of variations of the method.
Figure 5B:
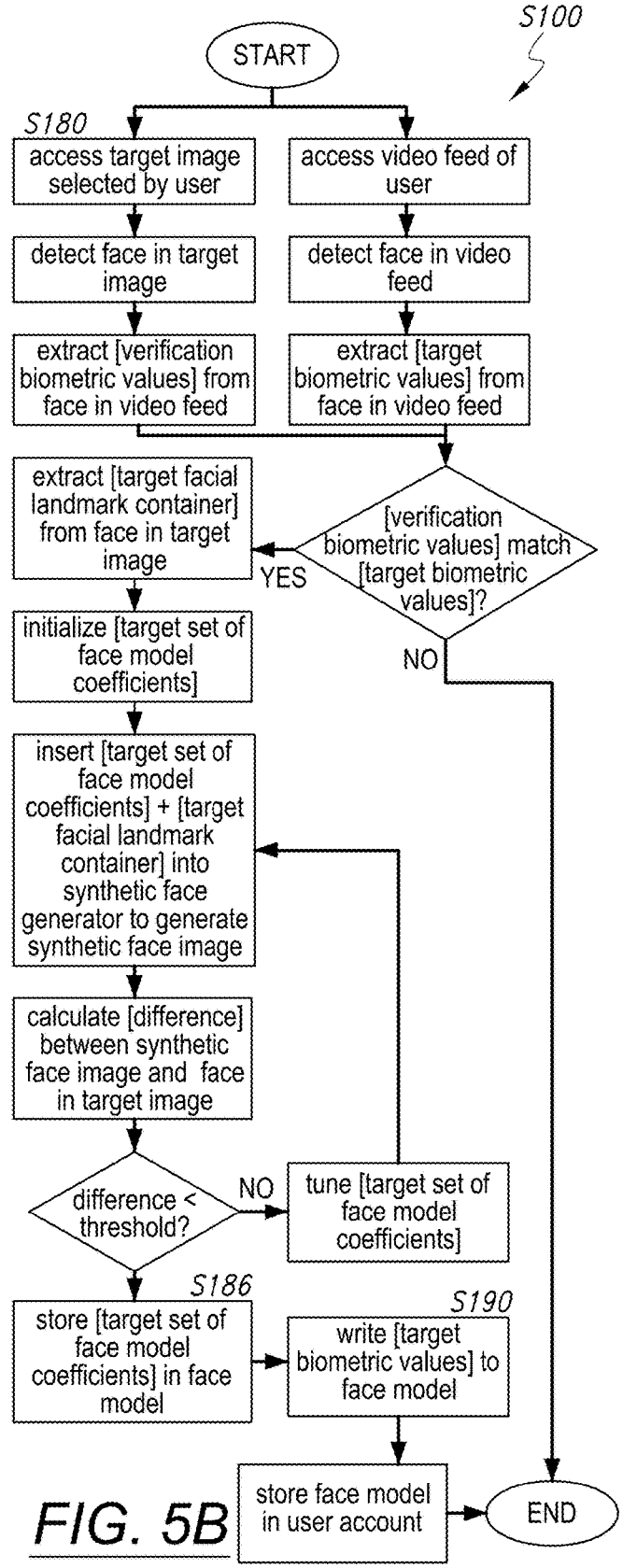
Figure 5C:
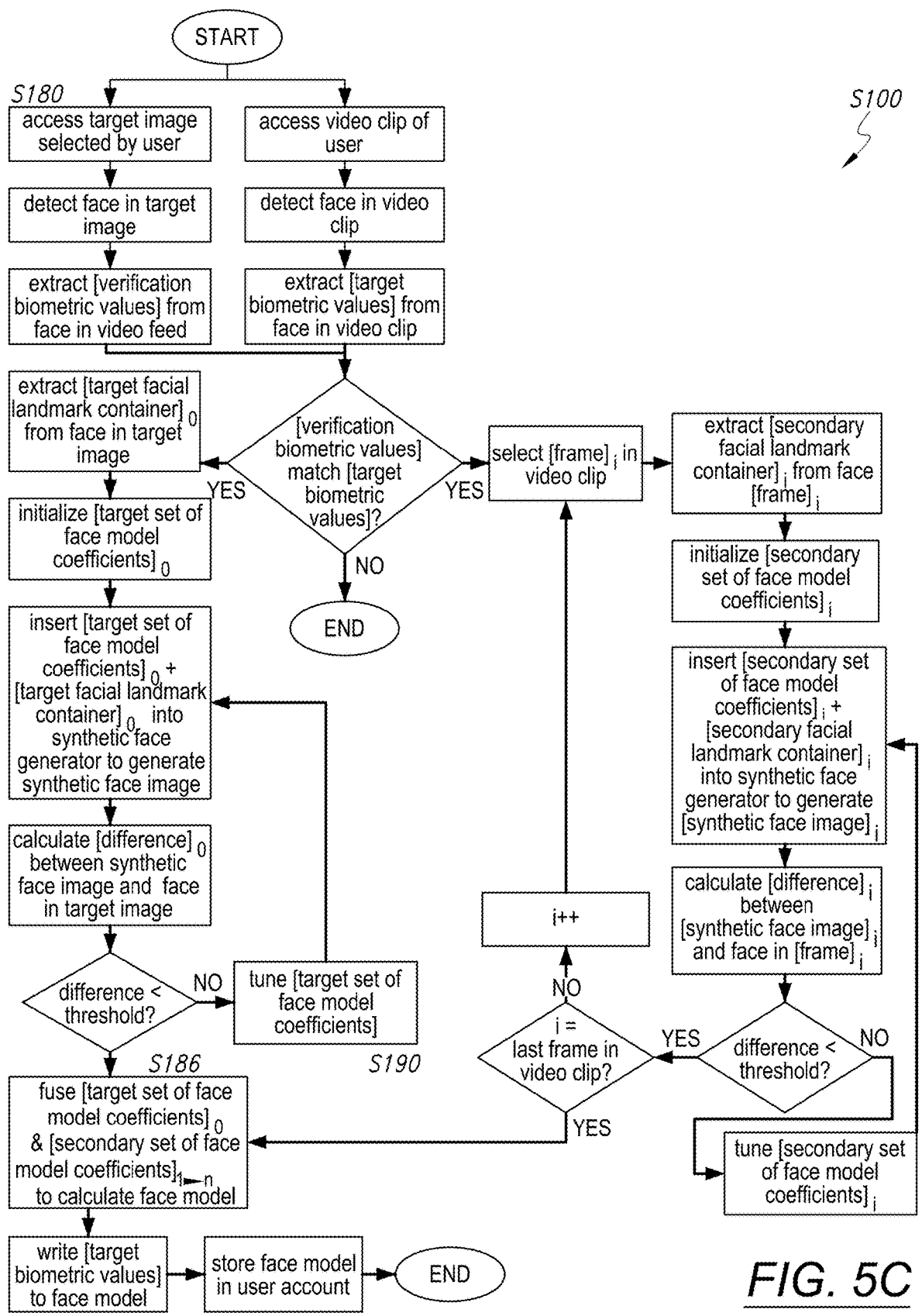

One variation of the method S100 shown in FIGS. 5A, 5B, and 5C includes, during a setup period: accessing a target image depicting a face of a first user in Block S180; generating a first face model based on a target set of facial features detected in the target image in Block S186; and linking the first face model to a target set of facial biometric values of the first user in Block S190.

Figure 6:
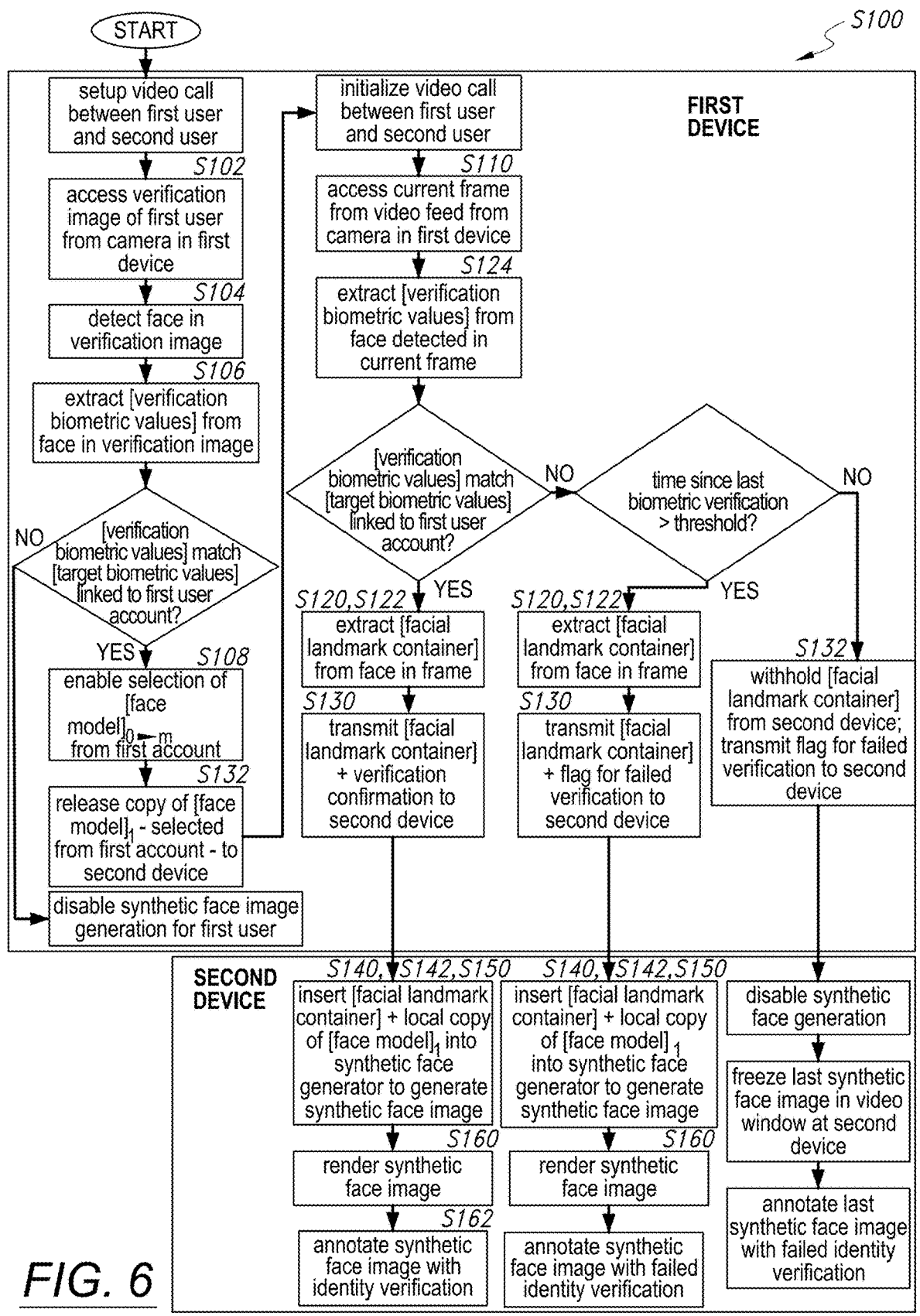
FIG. 6 is a flowchart representation of one variation of the method.

As shown in FIG. 6, this variation of the method S100 further includes, during an operating period succeeding the setup period: accessing a first frame in Block S110; deriving characteristics of a first set of facial features detected in the first frame in Block S120; extracting a first set of facial biometric values from the first frame in Block S124; and, in response to alignment between the target set of facial biometric values and the first set of facial biometric values, generating a first synthetic face image based on characteristics of the first set of facial features, the first face model, and a synthetic face generator in Block S150.

As shown in FIG. 6, a similar variation of the method S100 includes, during a video call between a first device and a second device following the setup period: accessing a first frame captured by the first device in Block S110; deriving characteristics of a first set of facial features detected in the first frame in Block S120; extracting a first set of facial biometric values from the first frame in Block S124; transmitting characteristics of the first set of facial features to the second device for combination with the first face model and a synthetic face generator to generate a first synthetic face image depicting the face of the first user at the second device in Block S130; accessing a second frame captured by the first device following the first frame in Block S110; extracting a second set of facial biometric values from the second frame in Block S124; and, in response to misalignment between the target set of facial biometric values and the second set of facial biometric values, preventing generation of a second synthetic face image, according to facial features depicted in the second frame, at the second device in Block S132.

1.2 Biometric Control for Face Model Access

Figure 7:
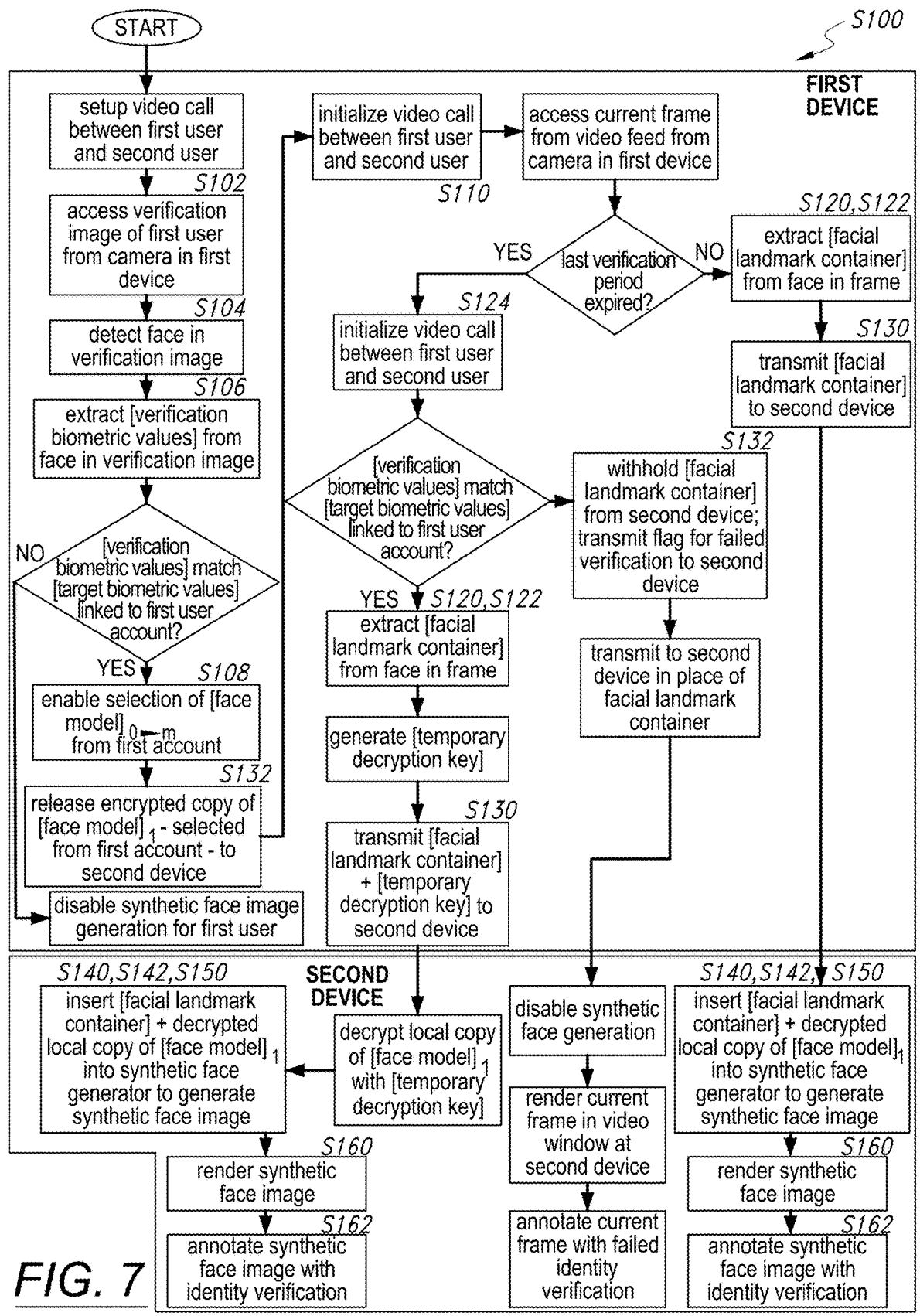
FIG. 7 is a flowchart representation of one variation of the method.

One variation of the method S100 shown in FIG. 7 includes, during a video call between a first device and a second device following the setup period, extracting a first set of facial biometric values from a first frame captured at the first device in Block S124. This variation of the method S100 also includes, in response to alignment between the target set of facial biometric values and the first set of facial biometric values: authorizing access to the first face model by the second device in Block S134; deriving characteristics of a second set of facial features detected in a second frame captured at the first device following the first frame in Block S120; and transmitting characteristics of the second set of facial features to the second device for combination with the first face model and a synthetic face generator to generate a synthetic face image depicting the face of the first user at the second device in Block S130.

2. Applications

Generally, Blocks of the method S100 can be executed by native or browser-based applications executing on a set of computing devices (e.g., smartphones, tablets, laptop computers) and/or a remote computer system before a video call between two users in order: to verify the identity of a first user (e.g., based on her facial characteristics); to enable the first user to select a particular look model (or "avatar," "skin") for this video call only after verifying her identity; and to selectively enable the second device to access this particular look model; and vice versa for the second user.

During the video call, Blocks of the method S100 can be further executed by this set of computing devices and/or the remote computer system: to regularly re-verify the identity of the first user based on facial biometric values detected in a first video feed captured at the first device; to compress the first video feed into a first lightweight (e.g., sub-kilobyte) feed of constellations of facial landmarks at the first device; and to reconstruct this first video feed—with the first user now depicted according to the particular look model selected for this video call—based on this first feed of facial landmark constellations and the particular look model only while the identity of the first user is verified.

Simultaneously, the second device can: regularly re-verify the identity of the second user based on facial biometric values detected in a second video feed captured at the second device; compress the second video feed into a second lightweight feed of constellations of facial landmarks at the second device; and transmit this feed of facial landmark constellations and verification of the second user's identity to the first device. Accordingly, the first device can: reconstruct the second video feed—with the second user now depicted according to a second look model selected by the second user for this video call—based on this second feed of facial landmark constellations and the second look model only while the identity of the second user is verified.

2.1 Bandwidth

In particular, rather than transmit and receive data-rich video feeds during a video call, a first device executing Blocks of the method S100 can instead extract facial landmark constellations from a first video feed captured at the first device, package these facial landmark constellations into facial landmark containers, and transmit a first feed of facial landmark containers to the second device. The second device can then: leverage a local copy of the synthetic face generator and a local copy of a first look model associated with the first user to transform the first feed of facial landmark containers into a photorealistic representation of the first user's face; and render this first photorealistic synthetic video feed in near real-time. Concurrently, the second device—also executing Blocks of the method S100—can extract facial landmark containers from a second video feed captured at the second device and transmit a second feed of facial landmark containers to the second device. The first device can then: leverage a local copy of the synthetic face generator and a local copy of a second look model associated with the second user to transform the second feed of facial landmark containers into a photorealistic representation of the second user's face; and render this second photorealistic synthetic video feed in near real-time. The second user may thus experience the video call as though a color video was received from the first user's device—and vice versa—without necessitating a consistent, high-bandwidth, low-latency data connection between the first and second devices.

More specifically, by extracting facial landmark containers from a high(er)-definition video feed according to the method S100, the first device can compress this high(er)-definition video feed by multiple orders of magnitude (e.g., by approximately 100 times). Transmission of a feed of facial landmark containers—at a natural frame rate of the original high(er)-definition video (e.g., 24 frames per second)—from the first device to the second device during a video call may therefore require significantly less bandwidth than the original high-definition video (e.g., less than 10 kilobits per second rather than 1.5 Megabits per second). The second device can: then reconstruct the first video feed of the first user by passing a local copy of a (pseudo)-unique look model of the first user and a first feed of facial landmark containers—received from the first device—into a synthetic face generator, which rapidly outputs a stream of synthetic, photorealistic images of the first user's face (e.g., in under 100 milliseconds or within as little as 30 milliseconds of a receipt of each subsequent facial landmark container from the first device); and render this stream of synthetic, photorealistic images of the first user's face. Therefore, the first and second devices can execute Blocks of the method S100 to support consistent, high-quality video—with significantly less upload and download bandwidth—during a video call.

2.2 Latency

Furthermore, humans may perceive audible and visual events temporally offset by up to 200 milliseconds as occurring concurrently. However, the first and second devices can cooperate to rapidly execute Blocks of the method S100. For example, the first device can: capture a video frame; generate first facial landmark container representing a first facial landmark constellation detected in this video frame; and upload this first facial landmark container to a computer network within 50 milliseconds. The second device can then: download this facial landmark container; inject this facial landmark container and a stored local copy of a first look model of the first user into a local copy of the synthetic face generator to generate a synthetic face image; overlay the synthetic face image on a static or animated background frame to generate a synthetic video frame; and render the synthetic video frame on a display of the second device within 150 milliseconds of receipt of the facial landmark container.

Generally, because the first device compresses a video feed (e.g., by orders of magnitude) into a stream of facial landmark containers (e.g., in the form of a vector containing 68 (x,y) coordinates for 68 predefined facial landmarks), packet size for facial landmark containers transmitted from the first device to the second device may be relatively very small. Therefore, throughput requirements to transmit this stream of facial landmark containers between the first and second devices over wireless and local area networks may be significantly less than actual throughputs supported by these networks. More specifically, transmission of this lightweight stream of facial landmark containers from the first device to the second device may represent a relatively small portion of the total duration of time from capture of a video frame at the first device to reconstruction and rendering of a corresponding synthetic video frame at the second device. Accordingly, this stream of facial landmark containers may not (or may very rarely) approach throughput limitations of these networks, thereby enabling these networks to transmit this lightweight stream of facial landmark containers from the first device to the second device with low latency, low packet loss, and high consistency despite changes in traffic between other devices connected to these networks and even during periods of high traffic on these networks.

2.3 Realism

By executing Blocks of the method S100, the first and second devices can render authentic, photorealistic representations of the second and first users, respectively, during a video call—such as relative to cartoons, avatars, or caricatures that may loose authenticity and integrity due to compression and simplification of user facial expressions.

For example, the first device and/or a remote computer system (e.g., a remote server, a computer network) can: access an image (e.g., a digital photographic image, a frame from a video clip) of the first user; detect the first user's face in this image; implement a standard or generic facial landmark extractor to detect and extract a facial landmark constellation; from this image; represent this facial landmark constellation in a facial landmark container; initialize a first look model containing an initial set of coefficients (or "weights"); pass this facial landmark container and the initial look model into a synthetic face generator to generate an initial synthetic face image; characterize a difference between this initial synthetic face image and the first user's face depicted in the image; and iteratively adjust coefficients in the first look model such that insertion of this first look model and the facial landmark container into the synthetic face generator produces synthetic face images with smaller differences from the first user's face depicted in the image. Once a difference between a synthetic face image thus produced according to the first look model and the first user's face depicted in the image falls below a threshold difference, the first device or the remote computer system can store this first look model in association with the first user, such as in an account or profile associated with the user.

In this example, the first device and/or the remote computer system can implement this process when the first user creates an account within a first instance of the native or browser-based video conferencing application executing on the first device, during a setup period just before starting a video call with the second device, or after starting a video call with the second device. Additionally or alternatively, the first device (or the remote computer system) can repeat this process for additional images or video clips of the first user (e.g., depicting the first user with various facial expressions and from various perspectives) and fuse look models thus calculated for these additional images or video clips into a single, more robust look model of the user.

The first device (or the remote computer system) can then share this look model—specific to the first user—with a second device before or during a video call. During this video call, the first device can also capture a video frame via an integrated or connected camera, extract a facial landmark container from this video frame, and stream this facial landmark container to the second device. The second device can then implement this look model to transform this facial landmark container into a synthetic, photorealistic image of the first user's face, which exhibits a facial expression of the first user, a mouth shape of the first user, and a position of the first user relative to the camera at a time that the camera captured the video frame.

Therefore, though the first device streams a feed of facial landmark containers to the second device rather than a live video feed of photographic video frames, the second device can leverage the look model of the first user and the synthetic face image to generate a photorealistic feed of synthetic images that both: appear to the second user as the first user; and authentically reproduce the first user's facial expression, mouth shape, and a position relative to the first device.

2.4 Security

Furthermore, the first device (and/or the remote computer system) can verify the identity of the first and second users before enabling the first user to access unique avatars or "skins" associated with her accounts; and the second device can reconstruct a video feed captured at the first device—but depicting the first user according to her selected avatar or "skin," which may differ from the first user's true appearance—only when the identity of the first user is verified. More specifically, because a look model in the first user's account may represent a model for transforming a facial landmark container into an authentic representation of the first user's face, someone other than the first user may impersonate the first user by feeding facial landmark containers and the look model into the synthetic face generator.

Therefore, the first device can verify the user's identity before granting access to look models in the first user's account, and the second device can limit generation of synthetic face images with the first user's look model to periods in which the first device has verified the first user's identify. More specifically, the first and second devices can cooperate to both: verify the first user before enabling the second user's device to access the first user's look model; and only generate synthetic face images according to the first user's look model and a sequence of facial landmark containers when the first user is positively identified in a video feed from which these facial landmark containers are derived.

2.5 Devices

The method S100 is described herein as executed by instances of a video conferencing application (hereinafter the "application"), such as a native video conferencing application or a browser application operable within a web browser executing on a device, such as a smartphone, tablet, or laptop computer.

Furthermore, Blocks of the method S100 are described herein as executed: by a first device to transform a first live video feed of a first user into facial landmark containers and to stream facial landmark containers to a second device; and by a second device to reconstruct and render a photorealistic, synthetic representation of the first video feed for viewing by a second user. However, the second device can simultaneously transform a second live video feed of the second user into facial landmark containers and stream facial landmark containers to the first device; and the first device can simultaneously reconstruct and render a photorealistic, synthetic representation of the second video feed for viewing by the first user.

Furthermore, the method S100 is described herein as implemented by consumer devices to host a two-way video call between two users. However, the first method can be similarly implemented by a device to host one-way live video distribution, or asynchronous video replay. Additionally or alternatively, Furthermore, the method S100 can be executed by multiple devices to host a multi-way video call between multiple (e.g., three, ten) users.

3. Facial Landmark Extractor

Figure 3:
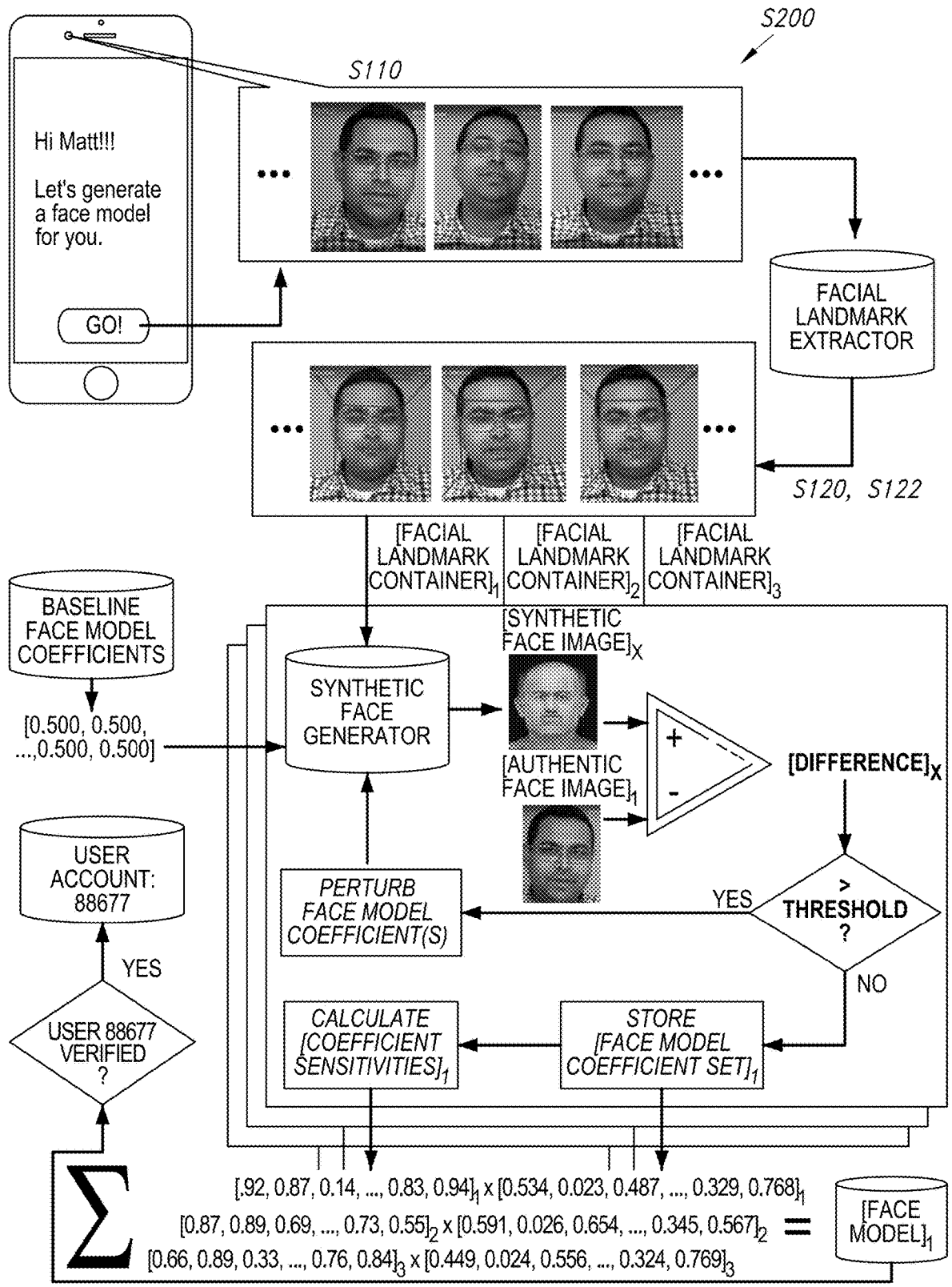
FIG. 3 is a flowchart representation of one variation of the method.
Figure 4:
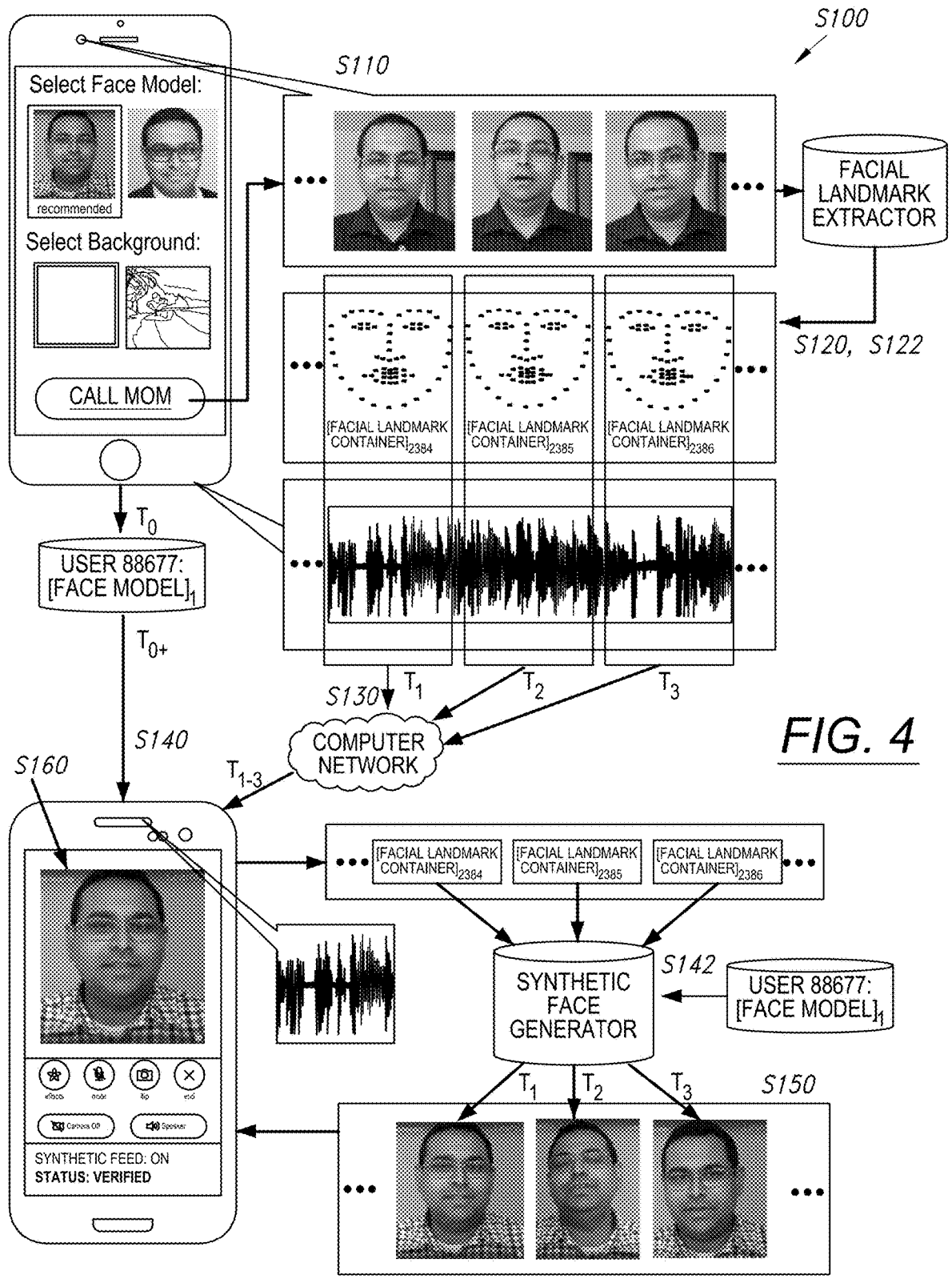
FIG. 4 is a flowchart representation of one variation of the method.

Generally, a device executing the application and/or the remote computer system can implement a facial landmark extractor: to detect a face in a region of an image (e.g., a photographic image, a frame in a video clip, and/or a frame in a live video feed); to scan this region of the image for features analogous to predefined facial landmark types; and to represent locations, orientations, and/or sizes, etc. of these analogous features—detected in the region of the image—in one facial landmark container. In particular, like the facial deconstruction model described above, the device and/or the remote computer system can implement the facial landmark extractor: to detect spatial characteristics of a face—such as including positions of eye corners, a nose tip, nostril corners, mouth corners, end points of eyebrow arcs, ear lobes, and/or a chin—depicted in a 2D image; and to represent these spatial characteristics in a single container (e.g., a vector, a matrix), as shown in FIGS. 3 and 4. For example, the device and/or the remote computer system can implement facial landmark detection to extract a facial landmark container: from a video frame during generation of a face model for a user (e.g., during initial setup of the user's account); from a photographic image during generation of a "look model" for the user; and/or from a video frame for transmission to a second device during a video call.

In one implementation shown in FIGS. 3 and 4, to generate a facial landmark container from an image (or frame), the device (or the remote computer system): accesses the image; implements facial detection techniques to detect a face in a region of the image; and initializes a facial landmark container in the form of a vector of length equal to a total quantity of predefined facial landmark types (e.g., 68). Then, for a first facial landmark type in this predefined set of facial landmark types, the device: scans the region of the frame for a feature analogous to the first facial landmark type; extracts a first location (and/or a first size, first orientation) of a particular feature depicted in the image in response to identifying this particular feature as analogous to (e.g., of a similar form, relative location, relative size) the first facial landmark type according to the facial landmark extractor; and then writes this first location (and/or first size, first orientation) of the particular feature to a first position in the vector corresponding to the first facial landmark type. Similarly, for a second facial landmark type in this predefined set of facial landmark types, the device: scans the region of the frame for a feature analogous to the second facial landmark type; and then writes a null value to a second position in the vector corresponding to the second facial landmark type in response to failing to identify a particular feature analogous to the second facial landmark time in the region of the image. The device then repeats this process for each other facial landmark type in the predefined set in order to complete the facial landmark container for this image.

Furthermore, in this example, the device (or the remote computer system) can generate a facial landmark container that represents a pixel position (e.g., an (x,y) coordinate) of each detected facial landmark type within the image—and not specifically the position of the facial landmark within the region of the image depicting the user's face—such that insertion of this facial landmark container and a face model of the user into a synthetic face generator: produces a synthetic face image that appears as a photographic analog of the user's face depicted in the image; and locates this synthetic face image in a position within a synthetic video frame that is analogous to the location of the user's face depicted in the image.

3.1 Other Features

In one variation, the facial landmark extractor detects and extracts other facial features from a region of an image depicting a face, such as in addition to or instead of facial landmarks. For example, the facial landmark extractor can: detect edges of the face, chin, lips, eyes, nose, and brow depicted in an image; define each of these edges as a sequence of keypoints within a 2D or 3D coordinate system; and store these keypoints in a facial landmark container for this image.

The method S100 is described herein as executed by a device and/or a remote computer system to detect and compile facial landmarks into facial landmark containers. However, the device and/or the remote computer system can additionally or alternatively detect and compile other such facial features into facial landmark containers.

4. Synthetic Face Generator

Similarly, the device and/or the remote computer system can implement a synthetic face generator to transform a facial landmark container—representing a facial expression of a user detected in an image or frame—and a face model of the user into a synthetic face image, which defines a photorealistic representation of the user's face with this same facial expression. In particular, like the facial reconstruction model described above, the device and/or the remote computer system can inject a facial landmark container—derived from an original image or frame of a user—and a face model of the user into the synthetic face generator to generate a synthetic face image that may be perceived as (at least) a superficially authentic photorealistic representation of the user's face with the same facial expression depicted in the original image or frame. For example, the device and/or the remote computer system can implement the synthetic face generator to generate a synthetic face image: to generate and validate a new face model for a user (e.g., during initial setup of the user's account); to generate and validate a new look model for the user; and/or to generate synthetic face images of another user during a video call.

Figure 2:
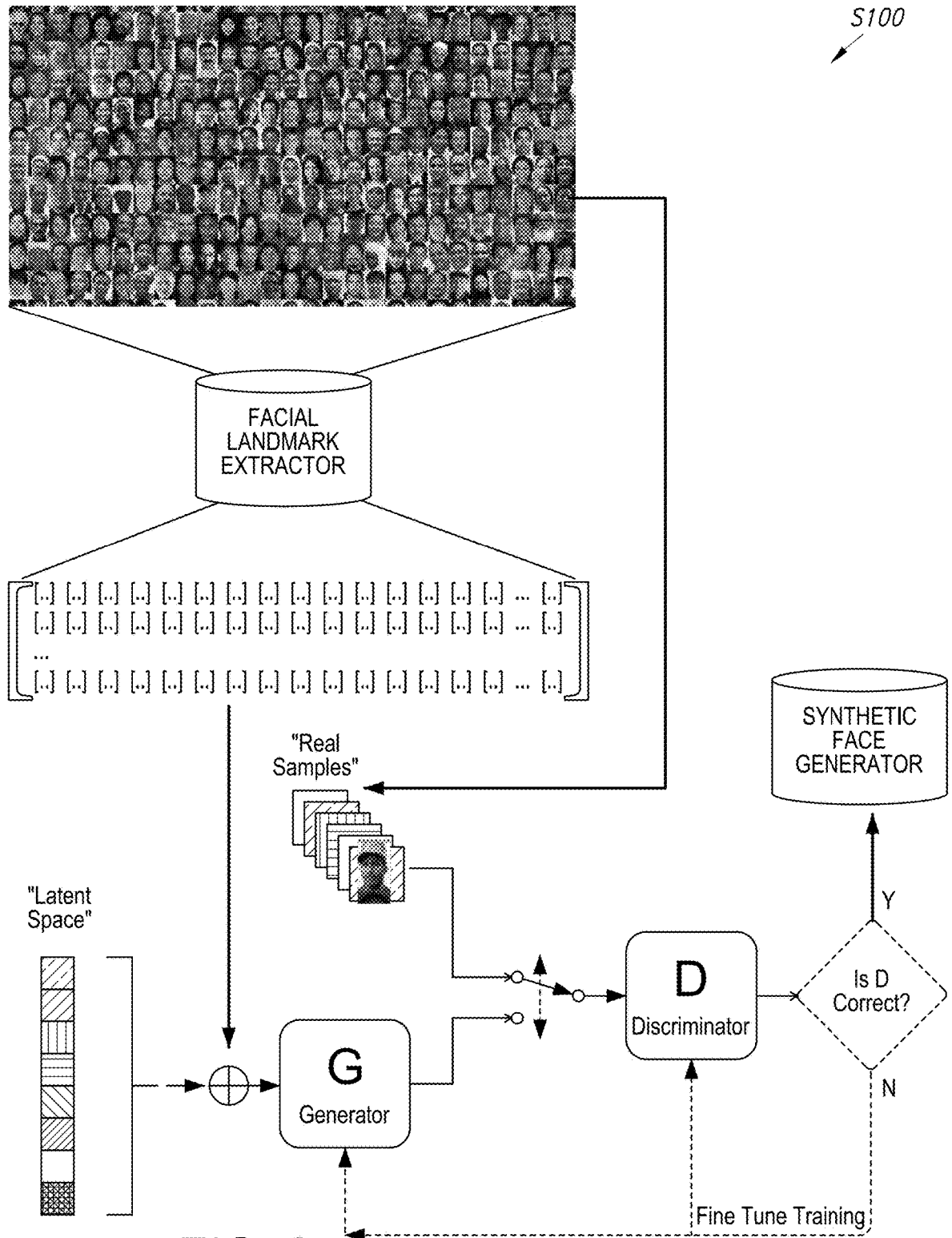
FIG. 2 is a flowchart representation of one variation of the method.

In one implementation shown in FIG. 2, the remote computer system: accesses a population of images of human faces (e.g., thousands, millions or 2D color images of human faces); implements the facial landmark extractor to extract a facial landmark container for each image in the population; and trains a conditional generative adversarial network to generate an image—given a facial landmark container and a face model containing a set of coefficients or "weights"— with statistics analogous to the population of images.

In particular, the remote computer system can train the conditional generative adversarial network to output a synthetic face image based on a set of input conditions, including: a facial landmark container, which captures relative locations (and/or sizes, orientations) of facial landmarks that represent a facial expression; and a face model, which contains a (pseudo-) unique set of coefficients characterizing a unique human face and secondary physiognomic features (e.g., face shape, skin tone, facial hair, makeup, freckles, wrinkles, eye color, hair color, hair style, and/or jewelry). Therefore, the remote computer system can input values from a facial landmark container and coefficients from a face model into the conditional generative adversarial network to generate a synthetic face image that depicts a face— (uniquely) represented by coefficients in the face model— exhibiting a facial expression represented by the facial landmark container.

The remote computer system can then store this conditional generative adversarial network as a synthetic face generator and distribute copies of this synthetic face generator to devices executing the application, as shown in FIG. 2.

5. Face Model Generation

Furthermore, the device can leverage the facial landmark extractor and the synthetic face generator to generate a face model for a user associated with the device in Block S186, such as: based on a video clip captured by the device during a user account setup period; based on a video clip captured by the device just before (e.g., seconds, minutes before) initiating a video call with another device; or based on an image (e.g., a "target image") uploaded or selected by the user before or during a video call with another device.

5.1. Single-Image Face Model Calculation

In one implementation shown in FIG. 5A, the device (or the remote computer system): detects a target face in a target image; represents a target constellation of facial landmarks, detected in the target image, in a target facial landmark container; initializes a target set of face model coefficients; generates a synthetic test image based on the target facial landmark container, the target set of face model coefficients, and the synthetic face generator; characterizes a difference between the synthetic test image and the target face detected in the target image; tunes the target set of face model coefficients to reduce the difference; and then generates a face model based on the target set of face model coefficients in Block S186.

More specifically, in this implementation, the device (or the remote computer system): accesses a target image of the user; detects a face in a target region of the target image; and implements the facial landmark extractor to generate a target facial landmark container. The device then: defines a target set of face model coefficients (or "weights," "conditions"); implements the synthetic face generator to transform the target facial landmark container and the target set of face model coefficients into a target synthetic face image; and characterizes a first difference between the target synthetic face image and the target region of the target image depicting the face. The device further: adjusts the target set of face model coefficients to reduce the first difference; implements the synthetic face generator to transform the target facial landmark container and the revised set of face model coefficients into a revised synthetic face image; characterizes a revised difference between the target synthetic face image and the revised region of the target image depicting the face; and repeats this process until this difference becomes asymptotic, approaches a null value, or falls below a threshold difference. Finally, the device generates a face model of the user based on the final set of face model coefficients thus calculated for the target image.

In this implementation, the user may upload or link to an existing image of herself, such as a digital copy of a headshot photograph or a profile image from a social networking website. Alternatively, the device can capture a photographic image of the user, such as during a user account setup period or just before (e.g., seconds, minutes before) a video call is started at the device. The device can then process this image locally to generate a face model for the user or upload this image to the remote computer system for remote face model generation.

In particular, the device (or the remote computer system) can: detect a face in a region of the image; extract or store this region of the image depicting the user's face as an "authentic face image"; implement the facial landmark extractor to extract a set of facial landmarks from the region of the image; and store these facial landmarks in a facial landmark container. The device can then initialize a new face model for the user containing a set of baseline coefficients. For example, the device can: initialize set of baseline coefficients that represent an "average" face (e.g., [0.500, 0.500, 0.500, . . . , 0.500, 0.500]); or pseudorandomly calculate baseline values for each coefficient in the new face model (e.g., [0.534, 0.023, 0.487, . . . , 0.324, 0.768]). The device injects baseline coefficients within the face model and the facial landmark container into the synthetic face generator, which outputs a "baseline" synthetic face image and characterizes a baseline difference between the authentic face image and the baseline synthetic face image.

In one example, the device: compresses or upsamples the synthetic face image to match a resolution of the authentic face image; subtracts the baseline synthetic face image from the authentic face image in the green color space to calculate a deviation image in the green color space; calculates a green-space deviation value based on a combination (e.g., a sum) of absolute values contained in pixels in the green-space deviation image; repeats this process for the blue and red color spaces to calculate red- and blue-space deviation values; and quantifies a total difference between the authentic face image and the baseline synthetic face image based on a combination (e.g., a sum, an average) of the red-, green-, and blue-space deviation values.

In another example, the device implements a structural similarity index (or "SSIM") to quantify a baseline difference between the baseline synthetic face image and the authentic face image. In yet another example, the device: implements a facial recognition system to calculate a confidence that the face depicted in the synthetic face image is identical to the face depicted in the authentic face image; and characterizes a baseline difference between the synthetic face image and the authentic face image based on (e.g., inversely proportional to) this confidence.

Then, if the baseline difference exceeds a threshold (e.g., if a combination of red-, green-, and blue-space deviation values exceeds a threshold value; if a structural similarity index value for the baseline synthetic face image exceeds a threshold), then the device (or the remote computer system) can repeat the foregoing process to refine and validate coefficients in the face model.

For example, the device can implement reverse propagation techniques to adjust (or "perturb") a first coefficient in the face model in a first direction and repeat the foregoing process to generate a revised synthetic face image based on this revised face model and the facial landmark container. Then, if a revised difference between the authentic face image and this revised synthetic face image is less than the baseline difference, the device can further perturb the first coefficient in the face model in the first direction. Conversely, if this revised difference between the authentic face image and the regenerated synthetic face image is greater than the baseline difference, the device can perturb the first coefficient in the face model in the opposite direction.

The device can repeat the foregoing process to refine the first coefficient in the face model, generate a new synthetic face image according to this revised face model, and verify that this new synthetic face image represents a better approximation of (i.e., exhibits less deviation from) the authentic face image than a synthetic face image generated according to a previous revision of the face model. The device can thus converge on a value for the first coefficient that minimizes a difference between: the authentic face image; and a synthetic face image generated by the synthetic face generator given the facial landmark container.

The device can repeat this process for each other coefficient in the face model in order to converge on a set of coefficients that minimize a difference between: the authentic face image; and a synthetic face image generated by the synthetic face generator given the facial landmark container. The device can also: store this set of coefficients in an initial face model; and then again repeat the foregoing process to further refine (or "tune") these coefficients, starting with this set of coefficients in the initial face model rather than baseline (e.g., average or pseudorandomly-generated) coefficients described above.

(In one variation, the device can implement the foregoing methods and techniques to tune multiple coefficients in the face model concurrently rather than tune coefficients in the face model individually.)

Once a difference between the authentic face image and a synthetic face image generated according to this set of coefficients becomes asymptotic, approaches a null value, or falls below a threshold difference, etc., the device (or the remote computer system) can store this set of coefficients in a face model and associate this face model with the user.

The device can therefore iteratively refine a set of coefficients in order to generate a face model that—when injected into the synthetic face generator with the facial landmark container—produces a synthetic face image that approximates the authentic face image, such as to a degree that a human may recognize the user in the synthetic face image and/or such that a human may discern no or limited visual differences between the authentic face image and the synthetic face image. More specifically, the device can execute the foregoing process to tune coefficients within a face model for the user such that insertion of this face model and the facial landmark container—extracted from the authentic face image—into the synthetic face generator produces a realistic approximation of the facial expression, face shape, skin tone, facial hair, makeup, freckles, wrinkles, eye color, hair color, hair style, and/or jewelry, etc. depicted in the authentic face image. Furthermore, insertion of this face model and a different facial landmark container—such as extracted from a video frame captured by the device during a later video call—into the synthetic face generator produces a realistic approximation of: the face shape, skin tone, facial hair, makeup, freckles, wrinkles, eye color, hair color, hair style, and/or jewelry, etc. depicted in the authentic face image; and the facial expression depicted in the video frame.

5.2 Face Model Calculation with Multiple Images

In a similar implementation shown in FIG. 3, the device (or the remote computer system) accesses a video clip of the user (e.g., captured by the device during a user account setup period, during a video call setup period preceding a video call with another user). For each frame in a (sub)set of frames in the video clip, the device implements methods and techniques described above to: detect the user's face in a region of the frame; characterize positions of a set of features—analogous to facial landmark types in the predefined set of facial landmark types—in the region of the frame; represent positions of the set of features in a facial landmark container; initialize a set of face model coefficients; insert the facial landmark container and the set of face model coefficients into the synthetic face generator to generate a synthetic face image; characterize a difference between the synthetic face image and the region of the frame depicting the face; and iteratively adjust the set of face model coefficients to reduce a difference between the region of the frame and a synthetic face image generated according to these face model coefficients. The device then calculates a combination of these sets of face model coefficients associated with this (sub)set of frames and stores this combination as a face model for the user.

In this implementation, the user may upload an existing video clip of herself, such as a video clip between five seconds and one minute in duration and/or containing between ten and 1,000 frames. Alternatively, the device can capture a video clip of the user, such as when a video call function is selected by the user and before a video call is initiated at the device. The device can then process this video clip locally to generate a face model for the user or upload this video clip to the remote computer system for remote face model generation.

5.2.1 Frame Selection

In particular, the device (or the remote computer system) can extract a set of frames from the video clip and then execute the foregoing methods and techniques to converge on a set of coefficients for each frame in this set. For example, the device can: implement methods and techniques described above to detect the user's face in each frame in the video clip; implement the facial landmark extractor to generate a facial landmark container for each frame in the video clip; and select a subset of frames (e.g., ten frames, 32 frames, 64 frames)—from the video clip—that correspond to facial landmark containers exhibiting least similarity and/or greatest ranges of facial landmark values within this set of facial landmark containers. More specifically, the device can compare facial landmark containers extracted from frames in the video clip to identify a subset of frames that represent a greatest range of face poses and facial expressions within the video clip.

5.2.2 First Frame

The device can then: select a first frame—from this subset of frames—associated with a first facial landmark container;

extract a first authentic face image from a region of the first frame depicting the user's face; initialize a set of baseline coefficients, as described above; and execute the processes described above to perturb these baseline coefficients and to converge on a first set of coefficients that—when combined with the first facial landmark container—produces a synthetic face image exhibiting a minimum difference from the first authentic face image.

5.2.3 Sensitivity

The device can also characterize a sensitivity of each coefficient—in this first set of coefficients—to accurate reproduction of the first authentic face image.

For example, once the device converges on a final value of a first coefficient in this first set of coefficients, the device can: pass the first set of coefficients—including the final value of the first coefficient—and the first facial landmark container into the synthetic face generator to generate a first synthetic face image; quantify a first difference between the first synthetic face image and the first authentic face image; perturb the final value of the first coefficient—in the first set of coefficients—by a perturbation unit (e.g., "0.005"); pass this perturbed set of coefficients—including the perturbed value of the first coefficient—and the first facial landmark container into the synthetic face generator to generate a perturbed synthetic face image; quantify a perturbed difference between the perturbed synthetic face image and the first authentic face image; and calculate a sensitivity of the first coefficient for the first frame proportional to a magnitude of difference between the first difference and the perturbed difference.

More specially, if perturbation of the final value of the first coefficient by the perturbation unit produces a small deviation from maximum (or "best") correspondence between a synthetic face image and the first authentic face image, the device can calculate a low sensitivity of the first coefficient for the first frame. However, if perturbation of the final value of the first coefficient by the perturbation unit produces a large deviation from maximum (or "best") correspondence between a synthetic face image and the first authentic face image, the device can calculate a high sensitivity of the first coefficient for the first frame.

The device can repeat this process for each other coefficient in the first set of coefficients to characterize sensitivity of accurate reproduction of the first authentic face image to each coefficient in this first set of coefficients.

5.2.4 Additional Frames

The device can repeat the foregoing process for each other frame in the (sub)set of frames, including: calculating a set of coefficients that minimize a difference between an authentic face image extracted from a frame and a synthetic face image generated according to the set of coefficients and a facial landmark container extracted from the frame image; and characterizing sensitivity of accurate reproduction of the authentic face image to each coefficient in the set of coefficients for each frame in the (sub)set of frames.

More specifically, the device can repeat the foregoing process for each other frame in the (sub)set of frames in order to generate a population of coefficient sets, wherein each set of coefficients in the population is tuned for one corresponding frame in the (sub)set of frames and wherein each coefficient in each set of coefficients in the population is associated with a sensitivity.

5.2.5 Face Model Composition

The device can then combine corresponding coefficients across this population of coefficient sets to calculate a face model for the user.

For example, the device can: calculate a first linear combination of first coefficients—across this population of coefficient sets—weighted by their corresponding sensitivities; store this first linear combination as a first composite coefficient; calculate a second linear combination of second coefficients—across this population of coefficient sets—weighted by their corresponding sensitivities; store this second linear combination as a second composite coefficient; and repeat this process for each other coefficient in this population of coefficient sets. The device then aggregates these composite coefficients into a face model for the user Therefore, the device can execute the foregoing process to tune coefficients within sets of coefficients for individual frames depicting the user and then fuse these sets of coefficients into one face model for the user. Insertion of this face model and a first facial landmark container—extracted from a first frame in this set—into the synthetic face generator produces a first realistic approximation of the facial expression, face shape, skin tone, facial hair, makeup, freckles, wrinkles, eye color, hair color, hair style, and/or jewelry, etc. depicted in the first frame. Similarly, insertion of this face model and a second facial landmark container—extracted from a second frame in this set—into the synthetic face generator produces a second realistic approximation of the facial expression, face shape, skin tone, facial hair, makeup, freckles, wrinkles, eye color, hair color, hair style, and/or jewelry, etc. depicted in the second frame.

Furthermore, insertion of this face model and a different facial landmark container—such as extracted from a video frame captured by the device during a later video call—into the synthetic face generator produces a realistic approximation of: the face shape, skin tone, facial hair, makeup, freckles, wrinkles, eye color, hair color, hair style, and/or jewelry, etc. depicted in the set of frames; and the facial expression depicted in the video frame.

5.2 Look Model

In one variation shown in FIG. 5C, the device (or the remote computer system) executes the foregoing processes: to calculate a set of face model coefficients for a "look" image uploaded or selected by the user (e.g., a digital photograph representing a physiognomy preferred by the user); to calculate a population of face model coefficient sets for frames in a video clip of the user; and to fuse these face model coefficient sets into a "look" model for the user, which yields synthetic face images that appear as the face in the "look" image when inserted into the synthetic face generator but that exhibit greater robustness to changes in face orientation and facial expression than a face model generated from a single frame or image.

In one implementation, the device (and/or the remote computer system) can implement methods and techniques described above to: detect a target face in a target image; represent a target constellation of facial landmarks, detected in the target image, in a target facial landmark container; initialize a target set of face model coefficients; generate a synthetic test image based on the target facial landmark container, the target set of face model coefficients, and the synthetic face generator; characterize a difference between the synthetic test image and the target face detected in the target image; and tune the target set of face model coefficients to reduce the difference. In this implementation, the device (and/or the remote computer system) can also access a video clip—separate from the target image—of the user. For each frame in a set of (e.g., all or a subset of) frames in the video clip, the device (and/or the remote computer system) can: detect the face of the user in a secondary region of the frame; characterize positions of a secondary set of features, analogous to facial landmark types in the predefined set of facial landmark types, detected in the secondary region of the frame; represent positions of the secondary set of features in a secondary facial landmark container; define a secondary set of face model coefficients; generate a secondary synthetic test image based on the secondary target facial landmark container, the secondary target set of face model coefficients, and the synthetic face generator; characterizes a secondary difference between the secondary synthetic test image and the secondary region of the frame depicting the face; and tune the secondary set of face model coefficients to reduce the secondary difference. The device (and/or the remote computer system) can then generate a face model for the user based on a combination of: the target set of face model coefficients derived from the target image; and secondary sets of face model coefficients derived from the video clip.

For example, the device can execute the process described above to: extract a target authentic face image from the look image; extract a target facial landmark container from the target authentic face image; converge on a target set of coefficients that minimize a difference between the target authentic face image and a synthetic face image generated by the synthetic face generator given the facial landmark container; and characterize sensitivity of accurate reproduction of the target authentic face image to each coefficient in the target set of coefficients.

The device can then combine this target set of coefficients with the face model—generated according to a (sub)set of frames extracted from a video clip—to generate a look model for the user. For example, the device can: retrieve a population of coefficient sets generated for the user based on the (sub)set of frames; retrieve a sensitivity for each coefficient in each coefficient set in this population; assign a target weight (e.g., 0.900) to each coefficient in the target set of coefficients generated according to the look image; and assign a secondary weight—less than the target weight (e.g., 0.100)—to each coefficient set in the population of coefficient sets. For a first coefficient, the device can then: calculate a corrected weight of the first coefficient in the target set of coefficients based on a combination (e.g., a product) of the target weight and a sensitivity of the first coefficient in the target set of coefficients; calculate corrected weights of the first coefficient across the population of coefficient sets based on combinations (e.g., products) of the secondary weight and sensitivities of the first coefficient across the population of coefficient sets; calculate a first linear combination of first coefficients—across the target coefficient set and the population of coefficient sets—according to their corresponding corrected weights; and store this first linear combination as a first composite coefficient in the look model. Similarly, for a second coefficient, the device can: calculate a corrected weight of the second coefficient in the target set of coefficients based on a combination of the target weight and a sensitivity of the second coefficient in the target set of coefficients; calculate corrected weights of the second coefficient across the population of coefficient sets based on combinations of the secondary weight and sensitivities of the second coefficient across the population of coefficient sets; calculate a second linear combination of second coefficients—across the target coefficient set and the population of coefficient sets—according to their corresponding corrected weights; and store this second linear combination as a second composite coefficient in the look model. The device can repeat this process for each other coefficient in this target set of coefficients and the population of coefficient sets in order to complete this look model for the user.

Therefore, the device can execute the foregoing process to tune coefficients in the face model according to a look image provided by the user and to compile these tuned coefficients into a look model. Insertion of this look model and a first facial landmark container—extracted from a look image—into the synthetic face generator produces a realistic approximation of the facial expression, face shape, skin tone, facial hair, makeup, freckles, wrinkles, eye color, hair color, hair style, and/or jewelry, etc. depicted in the look image.

Furthermore, insertion of this look model and a different facial landmark container—such as extracted from a video frame captured by the device during a later video call—into the synthetic face generator produces a realistic approximation of: the face shape, skin tone, facial hair, makeup, freckles, wrinkles, eye color, hair color, hair style, and/or jewelry, etc. depicted in the look image; and the facial expression depicted in the video frame.

More specifically, in this variation, the device can leverage the face model (or a population of coefficient sets) generated for the user in order to create a "look model" based on a single look image. When the look model is injected into the synthetic face generator, the synthetic face generator can thus return a synthetic face image that approximates: the skin tone, facial hair, makeup, hair style, and/or jewelry, etc. depicted in the look image; rather than the skin tone, facial hair, makeup, hair style, and/or jewelry, etc. depicted in the set of images that yielded the face model. In particular, synthetic face images generated by the synthetic face generator according to the look model may thus resemble the user's face in the look image rather than the user's face in the set of frames.

The device can thus generate a new look model for the user based on a single look image provided by the user, such as a personal favorite candid photo of the user from an event for which a video or multiple images of the user are not available.

5.4 Multiple Looks

The device (or the remote computer system) can execute the foregoing methods and techniques to generate a face model and a set of look models for the user and to associate this face model and these look models (hereinafter "look models") with the user, such as by storing these look models in the user's account, as shown in FIGS. 1A and 4.

In one variation, the device also prompts the user to associate each look model with a particular contact or group of contacts. For example, the device can execute the foregoing process to generate: a first look model based on a first look image depicting the user as clean-shaven, clean-cut, without a hat, and wearing a tie; a second look model based on a third look image depicting the user as clean-shaven, clean-cut, without a hat, and without a tie; a third look model based on a third look image depicting the user with a beard and wearing a hat; and a fourth look model based on a fourth look image depicting the user with a beard, longer hair, and wearing facial piercings. In this example, the device can interface with the user: to associate the first look model with a first group of work-related contacts; to associate the second look model with a second group of contacts including the user's grandparents and extended family; to associate the third look model with a third group of contacts including the user's parents and siblings; and to associate the fourth look model with a fourth group of contacts including the user's closet friends, spouse, and children.

However, the device (and/or the remote computer system) can generate a set of face and look models and associate these face and look models within individual contacts or groups of contacts in any other way.

5.5. Avatar Creation

The user's device (and/or the remote computer system) can also interface with the user to generate a (unique) skin model (or "avatar") that contains a set of coefficients and is configured to generate a synthetic face image representing an authentic physiognomy—different from the user—when inserted into the synthetic face generator with a facial landmark container extracted from an image of the user's face. More specifically, the device can interface with the user to generate a custom skin model in a format similar to the user's face or look model but that produces synthetic face images that differ—subtly (e.g., a change in eye and skin color) or significantly (e.g., different gender and facial structure)—from the user's true physiognomy.

In one implementation, the device: pseudorandomly generates a first set of coefficients characterizing a unique human face and secondary physiognomic features, such as described above; stores this first set of coefficients as a first skin model option; and repeats this process to generate a first group of (e.g., four) skin model options, each containing a set of pseudorandomly-generated coefficients that characterize a unique human face and secondary physiognomic features. The delivery vehicle then: accesses an image of the user (e.g., a live video frame); detects a face in the image; extracts a facial landmark container from this face in the image; and passes each skin model option in the first group and the facial landmark container of the user into the synthetic face generator to generate a first group of synthetic face images.

The device renders the first group of synthetic face images for the user and prompts the user to select a preferred synthetic face image from the first group.

If the user selects the first synthetic face image corresponding to the first skin model option, the device then: pseudorandomly generates a second set of coefficients that are nearer (e.g., exhibit shorter R-squared distances in n-dimensions) to the first skin model option than to other skin model options in the first group; repeats this process to generate a second group of (e.g., four) skin model options, each containing a set of pseudorandomly-generated coefficients nearer to the first skin model option than to the other skin model options in the first group; and passes each skin model option in the second group and the facial landmark container of the user into the synthetic face generator to generate a second group of synthetic face images.

The device: renders the second group of synthetic face images for the user; prompts the user to select a preferred synthetic face image from the second group; and repeats the foregoing process based on the user's selection from the second group—and subsequent groups—of synthetic face images. For example, the device can repeat this cycle for a maximum of six times or until the user otherwise confirms a particular synthetic face image generated during these cycles.

Once the user confirms a particular synthetic face image generated in this sequence, the computer system can: retrieve the skin model option corresponding to this particular synthetic face image as a new "skin" model for the user; and store this skin model in the user's account or otherwise link this skin model to the user's account.

Therefore, this new skin model may not depict a current or past physiognomy of the user but rather an authentic-looking, purely-synthetic, AI-generated representation of a human face. The user may then elect this skin model during a subsequent video call, such as to obscure the user's identity from another attendee on the video call.

6. Model Ownership+Security

As shown in FIG. 3, when generating a face or look model based on an image or video clip of the user, the device (or the remote computer system) can extract biometric data (e.g. "facial biometric values," a "faceprint") from the image or video clip and associate these biometric data: with the look model specifically; and/or with the user's account more generally. Later, the device can enable a second device to access this look model—specific to and owned by the user—in preparation for a video call only after positively matching biometric data associated with the look model (or the user's account more generally) to biometric data extracted from a video feed or frame captured by the device before and/or during this video call.

For example, during a setup period, the device can: access a prerecorded target image depicting a face of the user, such as uploaded from a photo book by the user, in Block S180; detect a target set of facial features (e.g., facial landmarks) in the target image; and implement methods and techniques described above to generate a face model (or a look model, etc.) based on the target set of facial features in Block S186. The device can also: extract a target set of facial biometric values (e.g., a faceprint) of the user from the target image; link the face model to the target set of facial biometric values; and add the face model to the user's account, as shown in FIG. 5A.

Additionally or alternatively, the device can: retrieve a target set of facial biometric values (e.g., a faceprint) stored in the user's account (e.g., linked to a face model previously loaded into the user's account or extracted from the video clip previously supplied by the user); extract a verification set of facial biometric values from the target image; and check alignment between the target set of facial biometric values derived from the video feed and the verification set of facial biometric values derived from the target image. Accordingly, given sufficient alignment (e.g., a "match") between the target set of facial biometric values and the verification set of facial biometric values, the device (or the remote computer system) can: link the face model to the target set of facial biometric values; and add the face model to the user's account, as shown in FIG. 5B. Otherwise, the device can discard this new face model.

The device (or the remote computer system) can additionally or alternatively extract these biometric data from a depth image, an audio clip of the user speaking, a optical eye scanner, or any other biometric data source.

6.1 Look Model from Target Image+Biometrics from Face Model

Additionally or alternatively, when the user supplies a look image for generation of a look model, the device (or the remote computer system) can: extract biometric data from the look image; verify correspondence between these biometric data and biometric data associated with the existing face model; and then generate a look model based on the look image and the existing face model only after confirming correspondence between these biometric data.

6.2 Look Model from Target Image+Biometrics from Video Clip

Similarly, the device can verify correspondence between biometric data extracted from a look image and a video clip captured by the device before transforming the look image and this video clip into a look model, as described above. The device (or the computer system) can therefore prevent the user from generating a new look model that impersonates another individual by verifying that photographs or a video clip submitted by the user for a new look model depicts the user specifically.

In one example shown in FIG. 5B, during a setup period, the device can: access a prerecorded target image depicting a face of the user, such as uploaded from a photo book by the user, in Block S180; detect a target set of facial features (e.g., facial landmarks) in the target image; and implement methods and techniques described above to generate a face model (or a look model, etc.) based on the target set of facial features in Block S186. Before, during, and/or after this process, the device can also access a video feed—separate from the target image—of the first user, such as captured by a camera integrated into the device while the user configures the face model. The device can then: extract a target set of facial biometric values (e.g., a faceprint) of the user from the video clip; extract a verification set of facial biometric values from the target image; and check alignment between the target set of facial biometric values derived from the video feed and the verification set of facial biometric values derived from the target image. According, given sufficient alignment (e.g., a "match") between the target set of facial biometric values and the verification set of facial biometric values, the device (or the remote computer system) can: link the face model to the target set of facial biometric values; and add the face model to the user's account. Otherwise, the device can discard this new face model.

Therefore, in this implementation, the device can implement a facial biometrics check to verify that a user previously identified in a face model linked to the user's account is the same human depicted in the target image, thereby preventing the user from generating a look model with which the user may later spoof or deep-fake another human.

6.3 Model+Biometrics from Target Image+Video Clip

In a similar implementation in which the device generates a look model based on a target image and a video clip of the user, the device (and/or the remote computer system) can also verify that the target image and the video clip depict the same person.

In one example shown in FIG. 5C, the device can implement methods and techniques described above to generate a look model based on look model coefficients tuned according to the target image and look model coefficients tuned according to the video clip of the user. The device (or the remote computer system) can then: extract a target set of facial biometric values of the user from the video clip (e.g., a live video of the user captured during the setup period); and extract a verification set of facial biometric values from the target image (e.g., a preexisting image uploaded by the user). Given sufficient alignment between the target set of facial biometric values derived from the video clip and the verification set of facial biometric values, the device (or the remote computer system) can compile these look model coefficients, as described above, to generate a new look model. Otherwise, the device can discard this new face model.

Therefore, in this implementation, the device can implement a facial biometrics check to verify that the user present at the device is the same human depicted in the target image, thereby preventing the user from generating a look model with which the user may later spoof or deep-fake another human.

6.4 Skin Model

The device (or the remote computer system) can similarly link a skin model—generated for the user—uniquely to the user's account and enable access to this skin model only after positively identifying the user, such as in a video clip or photographic image.

7. Video Call Configuration

When a first user opens the native or browser-based video conferencing application executing on a first device, the first device can interface with the user to configure an upcoming video call with a second user, including selection of a look model for representing the first user at the second user's device, as shown in FIGS. 1A and 1B.

7.1 Pre-Call Biometric Check

In one implementation shown in FIGS. 1A, 6, and 7, (just) before or at the start of the video call, the first device: captures a verification image or a verification video clip of the first user; extracts biometric data from the verification image or verification video clip; and confirms that these extracted biometric data match or sufficiently correspond to biometric data associated with the user's account. For example, the first device can: access a video feed (or a "verification video feed") from a forward-facing camera in the first device as a user prepares to select a look model from a user account; extract facial biometric data from this video feed; implement facial (re)recognition techniques to verify the identity of this user—currently present at the first device—as the owner of the first user account; and then selectively enable this user to access models in this account responsive to successful (re)recognition of this user.

In a similar implementation, the device can limit access to a user account—and thus limit access the face and look models contained in this user account—until the device successfully matches facial biometric data stored in the user account to facial biometric data extracted from a live video feed captured by the device. Once the device thus verifies the user, the device (and/or the remote computer system) can enable this user to access face and look models contained in this account.

In one variation in which the first user account is invited to the video call, the first device can also verify the identity of the user at the first device as the owner of the first user account and selectively enable the user to access the video call accordingly.

7.2 Face/Look Model Selection

Upon confirming this correspondence, the first device can prompt the user to select from a set of available look models—stored in the user's account or otherwise associated with the user—for the upcoming video call.

In one implementation, after confirming the identify of the user based on biometric data extracted from the verification image or verification video clip, the first device can access and render a stored synthetic face image for each available look model linked to the user's account.

Alternatively, the first device can generate a synthetic face image for each available look model linked to the user's account, such as by injecting a nominal facial landmark container (e.g., representing an average smiling face) and each available look model into the synthetic face generator to generate a set of nominal synthetic face images representing this set of look models. The first device can then render these synthetic face images within the application and prompt the first user to select a synthetic face image from this set, as shown in FIGS. 1A and 1B.

For example, once the first device verifies the user, the first device can: stream a video feed from a forward-facing camera in the first device; extract a feed of facial landmark containers from this video feed; inject the feed of facial landmark containers and a first model in the user's account into the synthetic face generator to generate a first synthetic face image feed; and repeat this process for each other model in the user's account to generate multiple synthetic face image feeds, each corresponding to one model in the user's account. The first device can then render these synthetic face image feeds, such as tiled across the display of the device or rendered within a magazine over which the user may swipe to view and selected from these available models. The first device can therefore enable the user to view live synthetic face image feeds generated according to the models stored in her account before selecting a particular model for the current or upcoming video call.

The first device can also suggest or recommend a particular look model for the video call. For example, if the first user has elected the second user from a contact list or address book and previously associated look models in her account with different groups of contacts, the first device can recommend a particular look model—from this set of available look models—associated with a contact group including the second user.

The first device can then retrieve a look model thus selected by the user (e.g., from local memory or from a remote database) and transmit a copy of this look model to the second user's device, as shown in FIGS. 1A and 1B.

Alternatively, the first device can return this selection to the remote computer system, and the remote computer system can transmit a copy of the corresponding look model to the second user's device or otherwise enable the second device to access a copy of this look model. Accordingly, the second device can load and store a temporary copy of this look model from the first user's account, such as for the duration of this video call.

7.3 Failed Biometric Check

Conversely, if the first device fails to verify that biometric data extracted from the verification image or verification video clip match or sufficiently correspond to biometric data associated with the first user's account, the first device (and/or the remote computer system) can disable access to the selected user account and/or to look models contained therein.

Additionally or alternatively, if the first device fails to verify that biometric data extracted from the verification image or verification video clip match or sufficiently correspond to biometric data associated with the first user's account, the first device (and/or the remote computer system) can implement methods and techniques described above to generate a new look model for the user in (near) real-time based on a video clip captured by the user's device just before or just after the first user enters the video call. Once the first device (or the remote computer system) generates this new look model for the first user, the first device (or the remote computer system) can: enable the first user and the second user to access and manipulate this new model exclusively to generate a synthetic face image feed of the first user during this video call; transmit this new look model to the second device; and activate transmission of a facial landmark container feed from the first device to the second device

7.4 Second Device

Therefore, prior to initiating a video call with the second device, the first device can interface with the first user to select a first look model of the first user, which defines how the first user is visually presented to the second user during the video call. Prior to entering or at the start of the video call, the second device can access or download a local copy of the first look model of the first user, as shown in FIG. 1A. More specifically, prior to the video call, the first device (or the remote computer system) can automatically grant the second device permission to securely download the first look model, etc. selected by the first user.

Concurrently and prior to entering the video call, the second device can interface with the second user to select a second model of the second user, which defines how the second user is visually presented to the first user during the video call, as shown in FIG. 1B. Prior to entering or at the start of the video call, the first device can access or download a local copy of the second look model. More specifically, prior to the video call, the second device (or the remote computer system) can automatically grant the first device permission to securely download the first look model, etc. selected by the second user.

Therefore, in preparation for the video call: the first device can store a temporary local copy of the second look selected by the second user who was verified—such as via face detection—as the owner of the second look by the second device; and the second device can store a temporary local copy of the first look selected by the first user who was verified as the owner of the first look by the first device.

8. Video Call

Then, during the video call, the first device can: capture a first video feed in Block S110; implement a local copy of the facial landmark extractor to represent constellations of facial landmarks—detected in the first video feed—in a first feed of facial landmark containers in Block S122; (intermittently) verify that the face detected and tracked throughout this first video feed matches biometric data associated with the first user account; and transmit the first feed of facial landmark containers and verification of the first user to the second device in Block S130 if this face is positively identified as the first user. Upon receipt, the second device can: transform the first feed of facial landmark containers and a local copy of the first look model of the first user into a first feed of synthetic face images according to the synthetic face generator in Block S150; and render the first feed of synthetic face images over the first background in Block S152, as shown in FIG. 1C.

Concurrently, the second device can: capture a second video feed in Block S110; implement a local copy of the facial landmark extractor to represent constellations of facial landmarks—detected in the second video feed—in a second feed of facial landmark containers in Block S122; (intermittently) verify that the face detected and tracked throughout this second video feed matches biometric data associated with the second user account; and transmit the second feed of facial landmark containers and verification of the second user to the first device in Block S130 if this face is positively identified as the second user. Upon receipt, the first device can: transform the second feed of facial landmark containers and a local copy of the second look model of the second user into a second feed of synthetic face images according to the synthetic face generator in Block S150; and render the second feed of synthetic face images over the second background in Block S152, as shown in FIG. 1C.

8.1 Facial Landmark Container Feeds

In particular, during the video call, the first device can: capture a first video feed; implement facial (re)recognition techniques to intermittently confirm the identity of the user depicted in the first video feed; compress the first video feed into a first facial landmark container feed when the first user is verified; and stream the first facial landmark container feed and user verification to the second device in near real-time (e.g., with a maximum time of 50 milliseconds from capture to upload).

For example, for a first video frame captured by the first device during the video call, the first device can execute a verification cycle, including: detecting a face in a first region of the first video frame; extracting facial biometric values from the first region of the first video frame; and implementing facial (re)recognition techniques to verify that these extracted facial biometric values sufficiently match stored facial biometric data (e.g., a stored faceprint) associated with the first user account.

If the result of the verification cycle is positive, the first device can implement a local copy of the facial landmark extractor to: detect the first user's face in a first region of the first video frame; detect positions of facial landmarks in the first region of the first video frame; and generate a first facial landmark container that represents positions of these facial landmarks in the first region of the first video frame. The first device can then upload verification of the first user, the first facial landmark container, and a first audio packet—captured around (e.g., within 50 milliseconds of) the first video frame—to a computer network, which distributes verification of the first user, the first facial landmark container, and the first audio packet to the second device.

In this example, the first device can also intermittently execute verification cycles to verify that the face in the first video feed is still the first user, such as once per second according to a verification schedule preconfigured for the video call. The first device can also: assign a validity duration (e.g., five seconds) to verification of the first user from a video frame; and return this validity duration—with verification of the first user—to the second device. Alternatively, the video call can be preconfigured for user re-verification on this time interval, and the second device can automatically assign a validation duration to verification of the first user—thus received from the first device—according to this preconfigured time interval.

Then, for a second (e.g., a next) video frame captured by the first device while the validity duration of the last verification of the first user is pending, the first device can: implement face tracking or object tracking techniques to track the first user's face from the first region in the first frame to a second region in the second video frame; and implement the facial landmark extractor to generate a second facial landmark container that represents positions of facial landmarks in the second region of the second video frame. The first device can then upload the second facial landmark container with a second audio packet—captured around a capture time of the second video frame—to the computer network, which distributes the second facial landmark container and the second audio packet to the second device.

Therefore, in the foregoing implementation, the first device can: first extract facial biometric data from a frame; verify the identity of the first user based on these facial biometric data; extract a facial landmark container only after verifying the identity of the first user; and then transit this facial landmark container to the second device. (The first device can also implement this serial biometric data and facial landmark container extraction process to identify a particular face—in a set of faces depicted in a frame—that corresponds to the first user and then extract a facial landmark container from this particular face only before transmitting this facial landmark container to the second device, thereby ensuring that only the first user's face is represented in facial landmark containers sent to the second device and that only the first user's face is represented in synthetic face images rendered at the second device.)

Conversely, the first device can: extract facial biometric data and a facial landmark container from a frame in parallel; verify the identity of the first user based on these facial biometric data; and then transit (or "release") this facial landmark container to the second device upon confirming the identity of the first user.

Yet alternatively, the first device can: extract a facial landmark container from a frame; interpret facial biometric data from this facial landmark container; verify the identity of the first user based on these facial biometric data; and then transit (or "release") this facial landmark container to the second device upon confirming the identity of the first user.

Concurrently, the second device can implement similar methods and techniques to verify the identity of the user at the second device, transform a second video feed into a second facial landmark container feed, and to return verification of the second user and the second facial landmark container feed to the first device.

8.2 Synthetic Face Image Feeds

During the video call, the second device renders a first background (e.g., selected by the first user) in a video call portal within a second instance of the application executing on the second device.

Upon receipt of verification of the first user for the first device, the second device can set a first verification timer for the validity duration. Upon receipt of a facial landmark container and a corresponding audio packet from the first device while this first verification timer is active, the second device can: extract audio data from the audio packet; insert the facial landmark container and the first look model of the first user into a local copy of the synthetic face generator—stored in local memory on the second device—to generate a synthetic face image; and render the synthetic face image over the first background within the video call portal (e.g., to form a "first synthetic video feed") while playing back the audio data via an integrated or connected audio driver.

By repeating this process for each audio packet and facial landmark container received from the first device during the video call, the second device can thus generate and render a first synthetic video feed depicting the first user's face over the first background—synchronized to playback of an audio stream from the first device—in near real-time (e.g., with less than one second of latency).

The first device can implement similar methods and techniques during the video call: to set a second verification timer for the validity duration upon receipt of verification of the second user for the second device; and to generate and render a second synthetic video feed depicting the second user's face over the second background—synchronized to playback of an audio stream from the second device—in near real-time while the second verification timer is active.

8.3 Re-Verification

Later, the first device can execute a next verification cycle according to the verification schedule, such as based on facial biometric values extracted from a later video frame captured by the first device one second after the first video frame, as shown in FIG. 1C. Upon verifying the identity of the first user at the first device, the first device can return verification of the first user and a facial landmark container—extracted from this later video frame—to the second device.

The second device can then reset the first verification timer and generate a synthetic face image according to the first look model and this next facial landmark container.

The second device can similarly execute a next verification cycle according to the verification schedule and return verification of the second user to the first device.

8.4 Verification Failed

However, if the first device fails to identify sufficient alignment between a facial biometric data (e.g., a "faceprint") associated with the first user account and facial biometric values extracted from a video frame captured by the first device during the video call (or if the first device otherwise fails to positively identify the first user during a verification cycle), the first device can withhold transmission of verification of the first user to the second device.

Furthermore, if the first device fails to positively identify the first user during a verification cycle, the first device can transition to executing a verification cycle based on facial biometric values extracted from every subsequent video frame—rather than only once per verification cycle—such as until the earlier of: positive identification of the first user in a video frame; a ratio of successful identification to failed identification of the user in these video frames exceeding a threshold ratio (e.g., 4:1); or expiration of the validity duration following initial failure to identify the first user at the first device. For example, the first device can continue to extract facial landmark containers from video frames captured after failure to positively identify the first user and transmit these facial landmark containers to the second device while attempting to re-verify the first user in the corresponding video frames. If the first device successfully identifies the first user in one or a minimum proportion of these video frames within the validity duration, the first device can return verification of the first user to the second device, which can reset its verification time accordingly. The second device can therefore generate and render an uninterrupted synthetic face image feed depicting the first user according to the first look model throughout this period.

However, if the first device fails to identify the first user in one or the minimum proportion of these video frames within the validity duration, the first device can disable transmission of facial landmark containers to the second device and instead send a notification of failed verification of the first user to the second device. The first device can render a notification for the user that synthetic video of the user has been disabled until the first user is positively identified in the first video feed.

Concurrently, the second device ceases generation of synthetic face images according to the first look model responsive to expiration of the verification time and notifies the second user of loss of synthetic video due to a possibility that the user at the first device is other than the first user.

After disabling the first facial landmark container feed, the first device can continue to execute verification cycles to attempt positive identification of the first user, such as until the first user is identified or the video call is canceled. In particular, upon re-verifying the first user in a subsequent video frame, the first device can transmit verification of the first user to the second device and resume generation and transmission of facial landmark containers to the second device. Accordingly, the second device can reset the first verification timer and resume generation and rendering of synthetic face images according to these facial landmark containers and the first look model.

The second device can implement similar methods and techniques to respond to failed verification of the second user in the second video feed.

8.5 Verification Feedback

Furthermore, the second device can communicate verification status—of the first user—to the second user, as shown in FIG. 1C.

For example, while the first verification timer for verification of the first user is active at the second device, the second device can indicate that the first user's identity is verified, such as by rendering: a virtual "green" verification icon near the synthetic face image feed displayed on the second device; a textual notification that the first user is currently verified (e.g., "John G. identified"); or render a "verified" watermark over the synthetic face image feed. Similarly, if the first verification timer expires, the second device can indicate that the first user's identity is unverified, such as by rendering: a virtual "red" failed verification icon near the synthetic face image feed displayed on the second device; a textual notification that the first user is currently unverified (e.g., "John G. NOT identified"); or render an "unverified" watermark over the synthetic face image feed. Additionally or alternatively, the second device can render a confidence score (0.000 to 1.000) that a human at the first device is the first user based on a last confidence score received from first device.

The second device can similarly present the verification status of the second user in (near) real-time.

In another implementation, the second device can also identify the first look model elected by the first user. For example, if the first look model does not represent an authentic physiognomy of the first user, the second device can present a message or otherwise indicate that the first synthetic face image feed depicts an avatar of the first user and is not representative of the user's true physiognomy. Similarly, if the first look model does represent an authentic physiognomy of the first user generated at a different time, the second device can present a message or otherwise indicate that the first synthetic face image feed depicts an authentic representation of a past or modified physiognomy of the first user. Similarly, if the first look model does represent an authentic physiognomy of the first user generated just before or during the video call, the second device can present a message or otherwise indicate that the first synthetic face image feed depicts an authentic representation of the user's physiognomy at the current time.

8.6 Example

In one example shown in FIG. 6, the second device can: load a local copy of a first face model before or at the start of a video call. During the video call, the first device can: access a first video feed captured by a camera coupled to or integrated into the first device; select a first frame—recorded at a first time—from the first video feed; detect a first constellation of facial landmarks in the first frame; represent the first constellation of facial landmarks in a first facial landmark container; and transmit the first facial landmark container to the second device. The first device can also: extract a first set of facial biometric values from the first frame; verify the identity of the first user at the first device based on alignment between a target set of facial biometric values—linked to the first face model or to the first user's account more generally—and the first set of facial biometric values; and then transmit verification (or "confirmation") of the identity of the first user to the second device upon verifying the identity of the first user currently present at the first device. The second device can then: generate a first synthetic face image based on the first facial landmark container, the local copy of the first face model, and the synthetic face generator upon receipt of confirmation of the identity of the first user; and render this first synthetic face image at approximately (e.g., within 500 milliseconds of; within 100 milliseconds of) the first time. The second device can also annotate the first synthetic face image as verified in response to receipt of confirmation of the identity of the first user, such as by rendering a colored (e.g., green) dot or a verification flag indicating confirmed identify in a corner of or near the synthetic face image.

Later, during the video call, the first device can: access a second frame captured by the first device at a second time; extract a second set of facial biometric values from the second frame; and withhold transmission of a second facial landmark container and/or verification of the first user's identify to the second device—thereby withholding or preventing generation of a second synthetic face image at the second device—in response to detecting misalignment between the target set of facial biometric values and the second set of facial biometric values.

In this example, in response to detecting misalignment between the target set of facial biometric values and the second set of facial biometric values, the first device can transmit the second frame—rather than facial landmarks extracted from the second frame—to the second device; and the second device can render the second frame in place of a synthetic face image at approximately the second time.

Alternatively, if the second time at which the first device captured the second image falls within a verification duration (e.g., two seconds) from the last verification of the first user (e.g., with the first image captured at the first time), the first device can transmit both the second facial landmark container and a flag for failed verification of the first user to the second device in response to detecting misalignment between the target set of facial biometric values and the second set of facial biometric values. Accordingly, the second device can: generate and render a second synthetic face image according to the second facial landmark container; and annotate the second synthetic face image as unverified.

Later during the video call, the first device can: access a third video feed captured at a third time; extract a third set of facial biometric values from the third frame; and compare this third set of facial biometric values to the target set of facial biometric values linked to the first face model and/or to the first user's account. If the third time at which the third frame was captured falls outside of the verification duration from the last verification of the first user and if the first device detects misalignment between the target set of facial biometric values and the third set of facial biometric values, the first device can withhold transmission of a third facial landmark container and/or verification of the first user's identify to the second device, thereby withholding or preventing generation of a third synthetic face image at the second device.

9. Face Disambiguation

In one variation, the first device uniquely identifies the face of a particular user—from multiple faces depicted in a frame—based on facial biometric data extracted from the frame and target facial biometric data linked to a selected face model associated with the particular user or to the particular user's account more generally. The first device then extracts facial landmarks from a region of the frame depicting the face of the particular user, compiles these facial landmarks into a facial landmark container, and transmits this facial landmark container to the second device, which then combines this facial landmark container with the selected face model associated with the particular user to generate a synthetic face image of the particular user. The first and second devices can also execute this process in parallel for each other face thus uniquely identified in the frame to generate synthetic face images for each of these users based on their unique, selected face models.

In one example, before or at a start of a video call, the first device: receives selection of a first face model from a first user present at the first device; implements methods and techniques described above the verify the identity of the first user; and authorizes the second device to load a local copy of the first face model. Later during the video call, the first device: accesses a frame captured by a camera in the first device; implements face detection techniques to detect a first face in a first region of the frame and a second face in a second region of the frame; extracts a first set of facial biometric values from the first region of the frame; extracts a second set of facial biometric values from the second region of the frame; and compares the first and second sets of facial biometric values to a first set of target facial biometric values linked to the first face model or to the first user's account more generally. Then, in response to alignment between the first target set of facial biometric values and the first set of facial biometric values extracted from the first region of the frame, the first device can: identify the first face as the first user; extract facial landmarks from the first region of the image; compile these facial landmarks into a facial landmark container; and transmit this facial landmark container to the second device. Conversely, in response to misalignment between the target set of facial biometric values and the second set of facial biometric values extracted from the second region of the frame, the first device can: flag the second face as other than the first user; and withhold transmission of facial landmarks depicted in the second region of the frame to the second device. Thus, the second device can generate a synthetic face image depicting the first user's face according to the frame but excluding the second face.

Thus, in this example, the first and second devices can cooperate to: maintain a synthetic face image feed depicting the first user according to the first look model and the first user's face as depicted in a video feed captured at the first device even as other faces enter and exit the video feed; and avoid generating synthetic face images or otherwise depicting these other faces at the second device.

Conversely, before or at a start of a video call, the first device can also: receive selection of a secondary face model from a secondary user present at the first device; implement methods and techniques described above to verify the identity of the secondary user; and authorize the second device to load a local copy of the secondary face model. Then, during the video call, the first device can: access a frame captured by a camera in the first device; implement face detection techniques to detect a first face in a first region of the frame and a second face in a second region of the frame; extract a first set of facial biometric values from the first region of the frame; extract a second set of facial biometric values from the second region of the frame; and compare the first and second sets of facial biometric values a) to a set of target facial biometric values linked to the first face and secondary models or b) to the first and secondary user's accounts more generally. In response to alignment between the first target set of facial biometric values and the first set of facial biometric values extracted from the first region of the frame, the first device can: identify the first face as the first user; extract facial landmarks from the first region of image; compile these facial landmarks into a first facial landmark container; and transmit this first facial landmark container to the second device with a flag or link to the first face model. Similarly, in response to alignment between the secondary target set of facial biometric values and the secondary set of facial biometric values extracted from the second region of the frame, the first device can: identify the second face as the secondary user; extract facial landmarks from the second region of the image; compile these facial landmarks into a secondary facial landmark container; and transmit this secondary facial landmark container to the second device with a flag or link to the secondary face model. The second device can then: generate a first synthetic face image depicting the first user's face according to the first facial landmark container and the first face model; generate a second synthetic face image depicting the secondary user's face according to the second facial landmark container and the secondary face model; and render both the first and second synthetic face images concurrently.

In this variation, the first and second devices can also implement methods and techniques described above: to track the first and second faces over subsequent frames during the video call; to selectively extract facial landmarks from corresponding regions of the frame; to independently verify the first and secondary users throughout the video call; and/or to indicate verification of the users over their corresponding synthetic face image feeds; etc.

10. Encrypted Look Model

In one variation shown in FIG. 7, the remote computer system (or the first device) stores encrypted look models for users. In this variation, once the first device receives selection of a look model from the first user account, the second device can download or access an (temporary or semi-permanent) encrypted local copy of this look model. Furthermore, once the first device (or the remote computer system) verifies that the user at the first device is the owner of the first user account, the remote computer system (or the first device) can generate an encryption key for the upcoming video call and transmit this encryption key to the second device. The second device can then: decrypt the first look model with this encryption key; implement the decrypted first look model for the duration of the video call to generate synthetic face images depicting the first user according to the first look model; and discard the decrypted first look model upon conclusion of the video call.

10.1 Temporary Key

In one variation shown in FIG. 7, the first look model includes a rotating encryption key, such as rotating on a fixed interval (e.g., once per five-second interval) when active during a video call and synchronized to a clock (e.g., a video call clock). In this variation, the rotating encryption key in the first look model can generate a set of secondary coefficients at the start of each key update interval, wherein each secondary coefficient in a set corresponds to one fixed primary coefficient in the look model.

In this variation, at the start of the video call, the rotating encryption key in the local copy of the first look model stored on the second device generates a first key containing a first set of secondary coefficients—for a first key interval of the video call—based on the current time of the video call. Concurrently, the first device: captures a first video frame; extracts a first facial landmark container and a first set of facial biometric values from the first video frame; and executes a first verification cycle to identify the first user based on these facial biometric values. Upon positively identifying the first user, the first device (or the remote computer system) generates a first inverse key for the first key interval based on: a local model of the rotating encryption key in the first look model; and the current time. In particular, the first inverse key contains a first set of inverse coefficients, wherein each inverse coefficient in the first inverse key is the numerical inverse of a corresponding secondary coefficient in the first key generated by the rotating encryption key for the first key interval. The first device then sends this first inverse key and the first facial landmark container to the second device.

The second device then passes the first inverse key, the first facial landmark container, and the look model (internally loaded with the first key) into the synthetic face generator to generate a first synthetic frame and renders this first synthetic frame in near real-time. In particular, the first set of secondary coefficients in the first key produce an (likely) unpredictable distortion of the synthetic face image output by the synthetic face generator if not paired with the first inverse key containing inverse coefficients of these secondary coefficients. Thus, by inserting both the first key and the first inverse key with the first facial landmark container and the first look model into the synthetic face generator, the second device can generate an undistorted synthetic face image according to the first look model and the first user's facial expression and pose at the corresponding time.

During this first key interval, the first device can continue to capture video frames, extract facial landmark containers from these video frames, and transmit this first facial landmark container feed to the second device. During this first key interval, the second device can also continue to pass the first inverse key and the first look model (still internally loaded with first key) with these facial landmark containers into the synthetic face generator to generate a synthetic face image feed depicting the first user's facial expressions and poses according to the first look model.

At the start of the next key interval (e.g., five seconds after the first key interval), the rotating encryption key in the local copy of the first look model stored on the second device can generate a second key containing a second set of secondary coefficients—for this second key interval of the video call—based on the current time of the video call. Concurrently, the first device can: capture a second video frame; extract a second facial landmark container and a second set of facial biometric values from the second video frame; and execute a second verification cycle to identify the first user based on these facial biometric values. Upon positively identifying the first user, the first device (or the remote computer system) can generate a second inverse key for the second key interval based on: the local model of the rotating encryption key in the first look model; and the current time. The second inverse key can thus contain a second set of inverse coefficients, wherein each inverse coefficient in this second inverse key is the numerical inverse of a corresponding secondary coefficient in the second key generated by the rotating encryption key for the second key interval. The first device then sends this second inverse key and the second facial landmark container to the second device.

The second device then passes the second inverse key, the second facial landmark container, and the look model (now internally loaded with the second key) into the synthetic face generator to generate a second synthetic frame and renders this second synthetic frame in near real-time. During this second key interval, the first device can continue to capture video frames, extract facial landmark containers from these video frames, and transmit this first facial landmark container feed to the second device. During this second key interval, the second device can also continue to pass the second inverse key and the first look model (still internally loaded with second key) with these facial landmark containers into the synthetic face generator to perpetuate the synthetic face image feed depicting the first user's facial expressions and poses according to the first look model.

However, if the first device fails to identify the first user, the first device (or the remote computer system) can withhold generation and transmission of an inverse key to the second device, and the second device can continue to input a last stored inverse key received from the first device, the first look model (internally loaded with updated keys), and facial landmark container received from the first depth sensor into the synthetic face generator, which outputs distorted synthetic face images due to incongruity between the current key stored in the first look model and the last inverse key received from the first device. Once the first device re-verifies the identity of the first user at the first device, the first device (or the remote computer system) can generate and return an updated inverse key to the second device in order to reestablish undistorted synthetic face images of the first user depicted according to the first look model.

The first and second devices can continue to execute this process until the conclusion of the video call.

10.2 Encryption Key and Encrypted Face Model

In a similar implementation, the first device transmits biometric verification of the first user to the second device in the form of an encryption key with each facial landmark container (or one encryption key per sequence of facial landmark containers generated within one key interval). The second device then inserts the encryption key and a facial landmark container pair within a local copy of a first face model—selected by the first user—into the synthetic face generator to generate a synthetic face image depicting the first user.

In one example, before or at a start of a video call, the first device: receives selection of a first face model from a first user present at the first device; implements methods and techniques described above the verify the identity of the first user; and authorizes the second device to load an encrypted copy of the first face model. Later during the video call, the first device: accesses a frame captured by a camera in the first device; implements face detection techniques to detect a first face in a first region of the frame; extracts a first set of facial biometric values from the first region of the frame; and compares the first set of facial biometric values to a first set of target facial biometric values linked to the first face model or to the first user's account more generally. Then, in response to alignment between the first target set of facial biometric values and the first set of facial biometric values extracted from the first region of the frame, the first device can: identify the first face as the first user; extract facial landmarks from the first region of the image; compile these facial landmarks into a facial landmark container; and transmit this facial landmark container and a first temporary encryption key to the second device.

In response to receipt of the first temporary encryption key, the second device can: inject the first temporary encryption key, the encrypted copy of the first face model, and the facial landmark container into the synthetic face generator to generate a synthetic face image depicting the first user; discard the first temporary encryption key; and then render this first synthetic face image.

The first and second devices can then repeat this process for each subsequent frame captured at the first device during the video call.

Alternatively, upon receipt of the first temporary encryption key, the second device can: decrypt the encrypted copy of the first face model with the first temporary encryption key to produce a time-limited (e.g., two seconds) or use-limited (e.g., 20 synthetic face images) decrypted first face model; inject the decrypted first face model and the facial landmark container into the synthetic face generator to generate a synthetic face image depicting the first user; render this first synthetic face image; and discard the first temporary encryption key. The second device can continue to generate synthetic face images based on subsequent facial landmark containers received from the first device and this decrypted first face model until the decrypted first face model expires. During this period of time, if the first device re-verifies the first user and returns a new temporary encryption key to the second device, the second device can repeat the foregoing process to: decrypt the encrypted copy of the first face model with this next temporary encryption key to produce a new time-limited or use-limited decrypted first face model; inject the newly-decrypted first face model and the next facial landmark container received from the first device into the synthetic face generator to generate a next synthetic face image depicting the first user; and render this first synthetic face image; etc.

However, the first and second devices can cooperate in any other way to secure the first face model before, during, and after a video call in order to prevent use of the first face model to generate synthetic face images by anyone other than the first user thus linked to the first face model via facial biometrics.

11. Voice

In one variation, the device (and/or the remote computer system) can implement similar methods and techniques to: extract biometric data from an image or video clip captured the forgoing model generation process; and associate these biometric data with a voice model derived from an audio clip of the user speaking. Accordingly, before or during a video call, the device can: verify the user's identify based on biometric data extracted from a verification image captured by the device; enable the user to select a face model and a voice model associated with the user (e.g., via biometric data); serve a temporary copy of the face model and voice model—selected by the user—to a second device once selected by the user; and then stream a feed of facial landmark containers (extracted from a video feed at the device) and vocal markers (extracted from an audio feed at the device) to the second device. The second device can then: fuse these facial landmark containers and the face model into a feed of synthetic face images; render this feed of synthetic face images; fuse these vocal markers into a synthetic audio feed; and playback this synthetic audio feed for the second user.

Additionally or alternatively, the device (and/or the remote computer system) can implement similar methods and techniques to: extract biometric data from an audio clip of the user speaking; link these vocal-type biometric data to a face model of the user (or to the user's account); and then selectively enable the user to access these face model in response to matching vocal-type biometric data—extracted from a later audio clip of the user speaking—to these vocal-type biometric data linked to the face model (or to the user's account).

12. Model Transfer

In one variation, the first device (and/or the remote computer system) cooperates with the first user and a second user to temporarily or permanently transfer a face (or look) model—previously generated with images and/or video clips of the first user and linked to the first user's facial biometrics—to the second user by temporarily or permanently writing facial biometrics of the second user to the face model.

In one implementation, during a video call between the first user and the second user, the first device enables the first user to authorize transfer of a face model to the second user. In this implementation, if the first user confirms such an authorization, the first device can also prompt the first user to confirm: temporary or permanent transfer of the face model to the second user; sole or mutual access to the first face model; an access duration for the first face model; etc. The remote computer system (and/or the first device, etc.) can then execute a model reassignment cycle as described below once confirmed by the second user.

In another implementation, the first device (and/or the remote computer system) interfaces with the first user to post (or "list") the first face model for access on a face model marketplace (e.g., an online "super-selfie" marketplace). For example, the first device can prompt the first user to confirm: temporary or permanent transfer of the face model to another user (e.g., lease or purchase of the first face model); sole or mutual access to the first face model; an access duration for the first face model (e.g., minutes, hours, days, years); and/or consideration for the first face model (e.g., a lease or purchase price; a face model trade); etc. The remote computer system (and/or the first device, etc.) can then generate a listing for the first face model according to these parameters and post this listing to the marketplace. The first device (and/or the remote computer system) can then execute a model reassignment cycle as described below once a second user selects and supplies consideration for the first face model.

In yet another implementation, the first device (and/or the remote computer system) interfaces with the first user to gift the first face model to another user. In this implementation, if the first user confirms such authorization, the first device can also prompt the first user to confirm: temporary or permanent transfer of the face model to the second user; sole or mutual access to the first face model; an access duration for the first face model; etc. The remote computer system (and/or the first device, etc.) can then execute a model reassignment cycle as described below once confirmed by the second user.

Then, during a reassignment, the remote controller can implement methods and techniques described above to access a second target set of facial biometric values of the second user, such as by retrieving a second target set of facial biometric values from the second user's account or from a particular look or face model stored in the second user's account. If the first and second users confirm permanent and sole transfer of the first face model to the second user, the remote computer system can: remove a first target set of facial biometric values—describing the first user—from the face model; write or link the second target set of facial biometric values to the first face model; and transfer the first face model into the second user's account. Alternatively, If the first and second users confirm mutual access of the first face model by both the first and second users, the remote computer system can: generate a copy of the first face model; write or link the second target set of facial biometric values to the copy of the first face model; and store this copy of the first face model in the second user's account.

Additionally or alternatively, if the first and second users confirm temporary transfer of the first face model to the second user, the remote computer system can: write or link the second target set of facial biometric values to the first face model (or to a copy of the first face model); write an expiration date or time to first face model (or to the copy of the first face model); store or link the first face model (or the copy of the first face model) in the second user's account; and then remove the first face model from the second user's account and unlink the second target set of facial biometric values from the first face model upon the expiration date or time.

Later, while access to the first face model by the second user is enabled, the second user's device can implement methods and techniques described above to: verify that the second user is authorized to access the first face model based on the second target set of facial biometric values linked to the first face model and facial biometric values extracted from a video feed of the second user during a video call between the second device and a third device; enable the third device to access a copy of the first face model during the video call; extract facial landmark containers from this video feed; and transmit these facial landmark containers to the third device for generation of synthetic face images depicting the second user as the first user (i.e., according to the physiognomy of the first user represented in the first face model).

Therefore, the first device, the second device, and/or the remote computer system can execute the foregoing process to selectively enable a second user to present herself as the first user (i.e., according to the physiognomy of the first user represented in the first face model) during a video call if previously authorized by the first user.

13. Other Synthetic Face Image Modalities

As described above, the first device, the second device, and/or the remote computer system can execute Blocks of the method S100 during a video call: to verify the identity of the first user and to generate facial landmark containers at the first device; and to generate and render synthetic face images of the first user according to a face (or look) model selected by the first user and these facial landmark containers at the second device.

Alternatively, the first device, the second device, and/or the remote computer system can execute Blocks of the method S100 during a video call: to generate facial landmark containers at the first device; and to verify the identity of the first user, to generate synthetic face images of the first user according to a face (or look) model selected by the first user and these facial landmark containers, and to render these synthetic face images at the second device.

Yet alternatively, the first device, the second device, and/or the remote computer system can execute Blocks of the method S100 during a video call: to generate facial landmark containers at the first device; to verify the identity of the first user at the remote computer system; and to generate and render synthetic face images of the first user according to a face (or look) model selected by the first user and these facial landmark containers at the second device.

Alternatively, the first device can execute Blocks of the method S100 (e.g., during a video call or private user session): to generate facial landmark containers; to verify the identity of the first user; and to generate synthetic face images of the first user according to a face (or look) model selected by the first user and these facial landmark containers at the second device. The first device can then: stream these synthetic face images to a second device during a video call; or render these synthetic face images as a synthetic video feed, such as for the first user to capture and post to a social networking platform; and/or render individual synthetic face images, such as for the first user to select and post to a social networking platform.

14. Post-Hoc Synthetic Frame Detection

In one variation, a user may have recorded a video of the first synthetic video feed—generated according to the first look model associated with the first user—and posted this video online or otherwise attempted to advertise the first synthetic video feed as authentic. Accordingly, the remote computer system and/or the second device can execute methods to enable post-hoc identification of synthetic face images.

14.1 Look Model Reconstruction

In one implementation, the remote computer system accesses a video of a suspected synthetic face image feed generated during a video call, as described above. The remote computer system then: selects frames from the video; detects a target face from these frames; extracts a set of facial landmark containers from these frames; and executes the face model generation process described above to calculate a set of coefficients that—when inserted into the synthetic face generator with facial landmark containers extracted from frames in this video—generates a set of synthetic face images that approximate the target face depicted in these frames.

The remote computer system then: stores this set of coefficients as a target look model; scans a library of look models contained in a population of user accounts for a small set of (e.g., ten) look models that are nearest the target look model (i.e., that contain coefficients that are nearest the set of coefficients of the target look model). If any of these look models fall within a minimum distance (e.g., an R-squared distance) of the target look model, the remote computer system can: flag the video as possibly synthetic (i.e., inauthentic); and flag these look models for investigation as possible sources of the synthetic video.

14.2 Watermarking

Additionally or alternatively, in the foregoing implementations, the second device can watermark every (or many, most) synthetic face image—generated from the first look model selected by the first user and a facial landmark container feed received from the first device—before rendering these synthetic face images. For example, the second device can overlay a dynamic (i.e., a moving) watermark over or around these synthetic face images when rendering these synthetic face images during the video call, as shown in FIGS. 1A and 1C.

15. Record

In one variation, the device (or the remote computer system, etc.) generates a record of instances that a face model in the user's account is accessed. For example, the remote computer system can write a time, date, recipient address, and recipient location (e.g., geospatial, IP address)—for each instance that a user's face model is accessed—to a distributed ledger (or a "blockchain"). The device (or the computer system) can then enable the user to inspect this distributed ledger to verify when, where, and by whom her face model was accessed by other parties.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   at a first time:
   accessing a first sequence of frames in a first video feed;
   detecting a first face of a first user, in the first sequence of frames;
   detecting a first set of biometric values in a first frame in the first sequence of frames;
   accessing a target set of biometric values linked to a first face model of the first user; and
   in response to correspondence between the target set of biometric values and the first set of biometric values:
   authorizing the first user to access the first face model;
   detecting a first series of facial features in the first sequence of frames; and
   generating a first synthetic video feed based on the first series of facial features, the first face model, and a synthetic face generator; and
   at a second time:
   accessing a second sequence of frames in a second video feed;
   detecting the first face of the first user in the second sequence of frames;
   detecting a second set of biometric values in a second frame in the second sequence of frames;
   in response to discordance between the target set of biometric values and the second set of biometric values, preventing access to the first face model by the first user; and
   rendering the second sequence of frames as a live video feed in place of the first synthetic video feed.

2. The method of claim 1:
   wherein accessing the first image comprises at a first camera, capturing the first image, comprising a first color image, depicting the first face of the first user;
   wherein detecting the first set of biometric values of the first user in the first image comprises extracting the first set of biometric values of the first user from the first color image;
   wherein accessing the second images comprises at the first camera, capturing the second image, comprising a second color image, depicting the second face of the second user; and
   wherein detecting the second set of biometric values of the second user in the second image comprises extracting the second set of biometric values of the second user from the second color image.

3. The method of claim 1:
   wherein authorizing the first user to access the first face model comprises verifying the identity of the first user;
   wherein generating the first synthetic video feed comprises inserting the first series of facial features and the first face model into the synthetic face generator for generation of the first synthetic video feed;
   further comprising, at the first time, publishing the first synthetic video feed annotated with identity verification of the first user; and
   wherein publishing the second sequence of frames as the live video feed comprises publishing the second sequence of frames as the live video feed, annotated with verification failure, in place of the first synthetic video feed.

4. The method of claim 1, further comprising at an initial time:
   accessing a target image depicting a target face;
   detecting a target constellation of facial landmarks in the target image;
   representing the target constellation of facial landmarks in a target facial landmark container;
   initializing a target set of face model coefficients;
   generating a synthetic test image based on the target facial landmark container, the target set of face model coefficients, and the synthetic face generator;
   characterizing a difference between the synthetic test image and the target face detected in the target image;
   tuning the target set of face model coefficients to reduce the difference;
   generating the first face model based on the target set of face model coefficients; and
   linking the face model to the target set of biometric values of the first user.

* * * * *